(12) United States Patent
Yuan et al.

(10) Patent No.: US 7,702,040 B1
(45) Date of Patent: Apr. 20, 2010

(54) METHOD AND APPARATUS FOR FREQUENCY DISCRIMINATOR AND DATA DEMODULATION IN FREQUENCY LOCK LOOP OF DIGITAL CODE DIVISION MULTIPLE ACCESS (CDMA) RECEIVERS

(75) Inventors: Xiang Yuan, Chandler, AZ (US); Gang Xie, Tempe, AZ (US)

(73) Assignee: SiRF Technology, Inc., San Jose, CA (US)

( * ) Notice: Subject to any disclaimer, the term of this patent is extended or adjusted under 35 U.S.C. 154(b) by 941 days.

(21) Appl. No.: 11/403,689

(22) Filed: Apr. 12, 2006

(51) Int. Cl.
*H04L 27/00* (2006.01)
*H04L 27/22* (2006.01)
(52) U.S. Cl. ........................................ 375/326; 329/306
(58) Field of Classification Search ................ 375/362, 375/376, 137, 343, 371, 140, 145, 147, 150, 375/326, 327, 354, 377; 342/464, 378, 357.01, 342/357.06–375.12, 357.17; 329/306, 307, 329/304; 701/213–216
See application file for complete search history.

(56) References Cited

U.S. PATENT DOCUMENTS

| | | | |
|---|---|---|---|
| 6,184,822 B1 * | 2/2001 | Fenton et al. .......... 342/357.12 |
| 6,607,437 B2 * | 8/2003 | Casey et al. .................... 463/16 |
| 6,904,098 B1 * | 6/2005 | Isaksen et al. .............. 375/261 |
| 6,912,242 B2 * | 6/2005 | Farine et al. ................ 375/147 |
| 6,922,167 B2 * | 7/2005 | Gerein .................. 342/357.12 |
| 7,020,225 B2 * | 3/2006 | Sindhushayana et al. .... 375/344 |
| 7,092,433 B2 * | 8/2006 | Oesch et al. ................ 375/148 |
| 2004/0013209 A1 * | 1/2004 | Zehavi et al. ............... 375/334 |
| 2004/0071234 A1 * | 4/2004 | Li .............................. 375/341 |
| 2006/0119506 A1 * | 6/2006 | Montheard et al. ..... 342/357.12 |

OTHER PUBLICATIONS

Elliot D. Kaplan and Christopher J. Hegarty, Understanding GPS: principles and applications.—2$^{nd}$ ed. Chapter 5, Book, 2006, 7 pgs., Artech House, Inc., Norwood, MA.

* cited by examiner

*Primary Examiner*—Tesfaldet Bocure
*Assistant Examiner*—Lawrence B Williams
(74) *Attorney, Agent, or Firm*—Maryam Imam; IPxLaw Group LLP

(57) ABSTRACT

An embodiment and method of the present invention includes a frequency lock loop (FLL) having an improved frequency error estimation and a low bit error rate (BER) in data demodulation by calculating and using an improved averaged phase rotation using 'valid' phase rotation samples.

26 Claims, 11 Drawing Sheets

(A) For 10-ms Samples

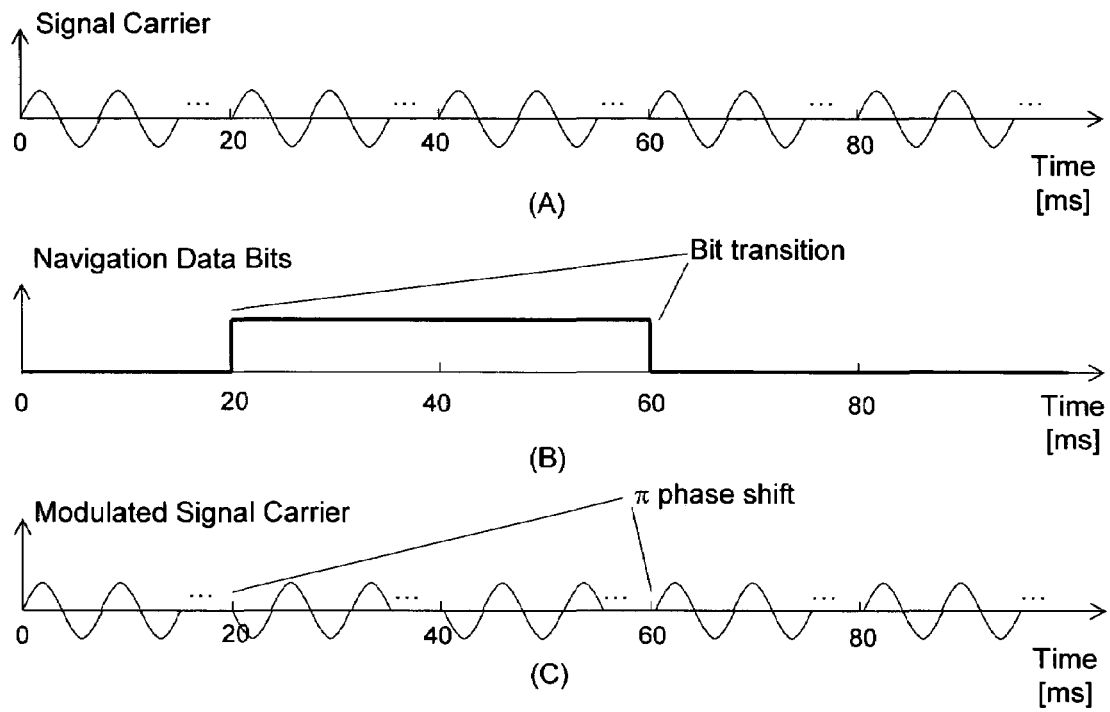
FIG. 4 *(Prior Art)*
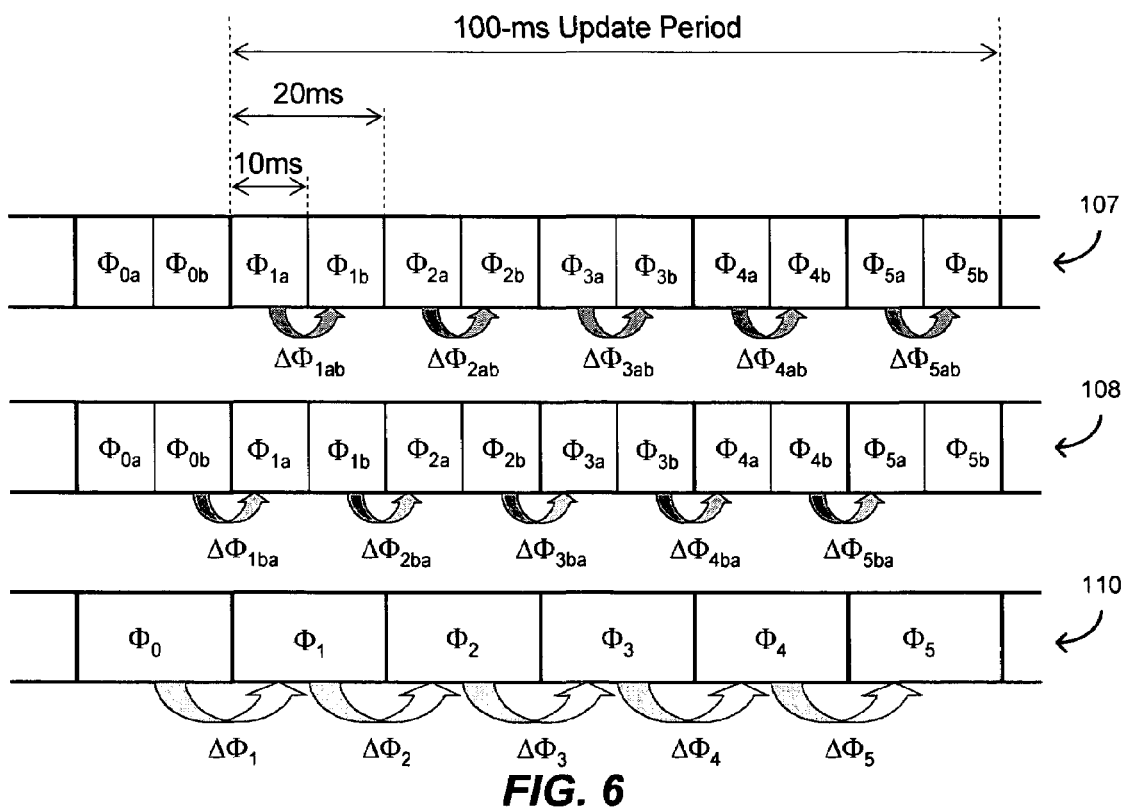
FIG. 6

(A) For 10-ms Samples  (B) For 20-ms Samples

METHOD AND APPARATUS FOR FREQUENCY DISCRIMINATOR AND DATA DEMODULATION IN FREQUENCY LOCK LOOP OF DIGITAL CODE DIVISION MULTIPLE ACCESS (CDMA) RECEIVERS

BACKGROUND OF THE INVENTION

1. Field of the Invention

The present invention relates generally to digital receivers for spread spectrum signals such as those used in Global Positioning System (GPS), and more particularly to a frequency discriminator and data demodulation techniques used in the carrier frequency lock loop (FLL) of digital code division multiple access (CDMA) spread spectrum receivers.

2. Description of the Prior Art

Global Positioning System (GPS) is a satellite-based radio navigation system. Each GPS satellite, also called space vehicle (SV), continuously transmits time-tagged spread-spectrum signals on two L-band carrier frequencies. Carriers are used for modulation of GPS signals, to be transmitted. "Carrier" and "carrier signal" are used interchangeably herein. Briefly, carrier is a sine/cosine wave characterized by its frequency. "Carriers" or "carrier signals", at a carrier frequency, as often referred to herein, are modulated by binary bits or code. Upon reception of a modulated signal, the carrier must be removed or the signal need be demodulated using a receiver-generated carrier at the same frequency as that of the received signal's carrier frequency in order to recover bits or code.

In GPS satellite-based radio navigation systems, each carrier is modulated by at least one of two pseudorandom noise (PRN) codes unique to the satellite. The L1 carrier at 1575.42 MHz is modulated by both the precise (P) code and the coarse/acquisition (C/A) code. The L2 carrier at 1227.60 MHz is modulated by the P code only. The encrypted P code is available only to military and other authorized users, while the C/A code is public to all commercial and civilian users.

The GPS radio-frequency (RF) signals of all SVs in view, captured by a GPS receiver antenna, are amplified and down-converted to an intermediate frequency (IF) that is further digitalized by an analog-to-digital (A/D) converter, as show in FIG. 1. A digital receiver channel consists mainly of a carrier tracking loop and a code tracking loop, as shown in FIG. 2.

FIG. 1 is a block diagram illustrating, generally, the components of a typical GPS receiver 10. The receiver 10 is shown to include a GPS antenna 12 coupled to a pre-amplifier block 14, which is shown coupled to a down-converter block 16, which is, in turn, shown coupled to a IF filter block 18. The block 18 is shown coupled to an A/D converter block 20, which is shown coupled to an N number of digital receiver channels 22 for providing measurement input to a navigation processing (or position-velocity-time estimation) block 24. The blocks appearing before or to the left of the N number of digital receiver channels 22 process information that is in analog form, whereas, the blocks appearing to the right of or after the block 20 process signals that are in digital form.

The GPS antenna 12 first captures GPS RF signals of all satellites that are in view. The captured RF signals are then amplified, by the pre-amplifier block 14 and down-converted, by the down-converter block 16 and provided to the IF filter block 18, the output of which is provided to the A/D converter block 20 for digitization thereof and provided to each of N number of digital receiver channels 22. One receiver channel tends to track signals of one satellite, measures code and carrier phases, and demodulates navigation data bits. When there are four or more satellite measurements available, the receiver can have a position, velocity and time (PVT) information, which is processed by the block 24.

FIG. 2 is a block diagram illustrating the carrier and code tracking loops in one of the N number of digital receiver channels 22 of FIG. 1. In FIG. 2, a digital receiver channel 26 is shown to include a carrier removal block 28 coupled to a code wipeoff block 30, which is shown coupled to an integrate and dump block 32, which is shown coupled to a code loop discriminator block 34 and a carrier loop discriminator block 40. The block 34 is shown coupled to a code loop filter block 36, which is shown to provide input to the code numerically-controlled oscillator (NCO) block 38. The block 38 provides properly-delayed PRN code to the block 30—"properly" refers to the receiver-generated code and carrier being properly delayed in order to match the received code and carrier—. The block 40 is shown coupled to the carrier loop filter block 42, which is shown coupled to the code NCO block 38 and to the carrier NCO block 44. The block 44 is shown to provide carrier signals having a proper phase delay or a delay at a proper frequency, to the block 28. The blocks 28, 30, 32, 40, 42 and 44 comprise the carrier tracking loop, as they cause tracking of the received signals' carrier phase or frequency and the blocks 28, 30, 32, 34, 36 and 38 comprise the code tracking loop for tracking of the received signals' PRN code phase. The block 28 receives, as input, a digital IF signal generated by the block 20 of FIG. 1.

The digital receiver channel 26 accomplishes signal tracking with a carrier tracking loop and a code tracking loop. The carrier tracking loop removes the carrier (plus carrier Doppler due to line-of-sight relative motion between the receiver and the satellite) from the digital IF signal and produces in-phase (I) and quadrature-phase (Q) sampled data for use by the block 30. The carrier tracking loop is designed to synchronize the phase or frequency of the local NCO with that of the received carrier signal.

The code tracking loop is often implemented as a delay lock loop (DLL). The DLL correlates the I and Q signals normally with early, prompt, and late replica codes to maintain PRN code lock, resulting in $I_E$, $Q_E$, $I_P$, $Q_P$, $I_L$ and $Q_L$ samples. The GPS 50-Hz navigation message data modulation remains after the carrier removal and code wipeoff. The block 32 provides signal integration, resulting in filtered $I_{ES}$, $Q_{ES}$, $I_{PS}$, $Q_{PS}$, $I_{LS}$ and $Q_{LS}$ samples. The integration time defines the pre-detection filter bandwidth. Based on the locked code phase, the signal transit time from the satellite to the receiver and therefore the distance (called pseudorange) between them can be measured. The receiver can compute its PVT if there are four or more pseudorange measurements available.

The carrier tracking loop can be implemented either as a phase lock loop (PLL) or as a frequency lock loop (FLL), based on its discriminator function. It can also be used to demodulate navigation data bits. A Costas PLL offers accurate carrier phase measurements and easy data demodulation mechanism, but the PLL is sensitive to dynamics stress potentially causing it to even lose tracking of a strong signal. On the other hand, the FLL relies on frequency measurements; it is more robust for tolerating dynamic stress. Unfortunately, data demodulation is more complicated in a FLL than in a PLL.

FIG. 3 is a phasor diagram illustrating a typical method of estimating the frequency error in a FLL. Phasor $A_a$ at time $t_a$, which is the vector sum of $I_a$ and $Q_a$ components, has a carrier phase angle of $\Phi_a = \tan^{-1}(Q_a/I_a)$. If an adjacent pair of samples $I_b$ and $Q_b$ is sampled within the same data bit interval as $I_a$ and $Q_a$, then their phase difference $\Phi_b - \Phi_a$, divided by their time difference $t_b - t_a$, is an estimate of the frequency error. Assuming that the pre-detection coherent integration time (PDI) in block 32 is $T_{PDI}$, then the detected frequency error is equal to $$\frac{\tan^{-1}(Q_b/I_b) - \tan^{-1}(Q_a/I_a)}{2\pi T_{PDI}} \text{ in Hz.} \qquad \text{Eq. (1)}$$

Theoretically, the FLL discriminator, of the block 40 of FIG. 2, can detect a maximum frequency error of $$+/- \frac{1}{2T_{PDI}}.$$

For example, if $T_{PDI}$ equals 10 ms, a maximum +/−50 Hz frequency error can be detected. This frequency error detection range is directly related to the pull-in range of a carrier tracking loop. The larger the detection range, the more frequency error is tolerable for a receiver to handoff from acquisition to tracking. The large frequency error tolerance also makes an FLL more appealing than a PLL when a receiver uses a low-cost oscillator and frequently experiences user dynamics. However, phase angle difference quantities are usually noisier than the phase angle measurements themselves, which also result in noisy frequency error estimate. This is one of the problems associated with prior art techniques of estimating the frequency error accuracy.

In FIG. 3, if the NCO generated frequency matches the incoming signal carrier, then the frequency error will be zero. Since the two sampling times $t_a$ and $t_b$ are within the same bit interval, this frequency error estimation method is insensitive to bit transitions; however, the variance of phase difference $(\Phi_b - \Phi_a)$ generally is twice as the variance of the phase $\Phi_a$ or $\Phi_b$, which leads to a noisy frequency error estimate.

FIG. 4 is a graph illustrating a binary phase shift keying (BPSK) modulation, which is used as the GPS navigation data modulation method. In BPSK, the carrier phase has a 180-degree (or $\pi$) phase shift when a data bit transition occurs. For example, at times 20 ms and 60 ms in FIG. 4, the data bit transitions are from 0 to 1 and from 1 to 0, respectively. Accordingly, the carrier phase has a $\pi$ phase shift at these two bit transitions. The $\pi$ carrier phase shifts, caused by unknown bit transitions, make data modulation difficult in an FLL.

Accordingly, there is a need for improving data demodulation in FLL utilized in digital CDMA spread spectrum receivers including GPS receivers. Furthermore, there is a need to improve the frequency error estimate accuracy in order to more accurately adjust the frequency of the receiver's generated carrier signal to match that of the received carrier signal and to continue to adjust to compensate for frequency shifts due to Doppler effects resulting from a moving receiver and/or satellite.

SUMMARY OF THE INVENTION

Briefly, an embodiment of the present invention includes a method and apparatus for improving estimation of frequency error in a frequency locked loop (FLL) and including receiving a predetermined number of samples of a $I_{ka}$, $Q_{ka}$, $I_{kb}$ and $Q_{kb}$, constructing longer coherently integrated samples $I_k$ and $Q_k$, calculating phase angles, $\Phi_{kab}$, $\Phi_{kba}$, $\Phi_k$, of samples, calculating phase rotations, $\Delta\Phi_{kab}$, $\Delta\Phi_{kba}$, $\Delta\Phi_k$ using the computed phase angle, computing averaged phase rotation $\Delta\Phi_{ab}$ using $\Delta\Phi_{kab}$ phase rotations between each pair of neighboring received samples that are within the same bit interval, determining 'valid' sample averaged rotation $\Delta\Phi_{kab}$ that is across bit edges, computing improved averaged phase rotation using 'valid' $\Delta\Phi_{kab}$ and determining the final phase rotation estimate $\Delta\Phi$ using longer integrated 'valid' sample rotation $\Delta\Phi_k$ to be used for calculation of frequency error.

The embodiment of the present invention also includes a method and apparatus for data demodulation using the estimated phase rotation, depending on whether the signal is in a steady-state tracking mode or not.

The foregoing and other objects, features and advantages of the present invention will be apparent from the following detailed description of the preferred embodiments which make reference to several figures of the drawing.

BRIEF DESCRIPTION OF THE DRAWINGS

FIG. 4 is a graph illustrating a binary phase shift keying (BPSK) modulation, which is used as the GPS navigation data modulation method.

FIG. 6 is a graph illustrating phase angles and phase angle rotations associated with 10-ms and 20-ms $I_{PS}$ and $Q_{PS}$ samples.

DETAILED DESCRIPTION OF THE PREFERRED EMBODIMENTS

Figure 1:
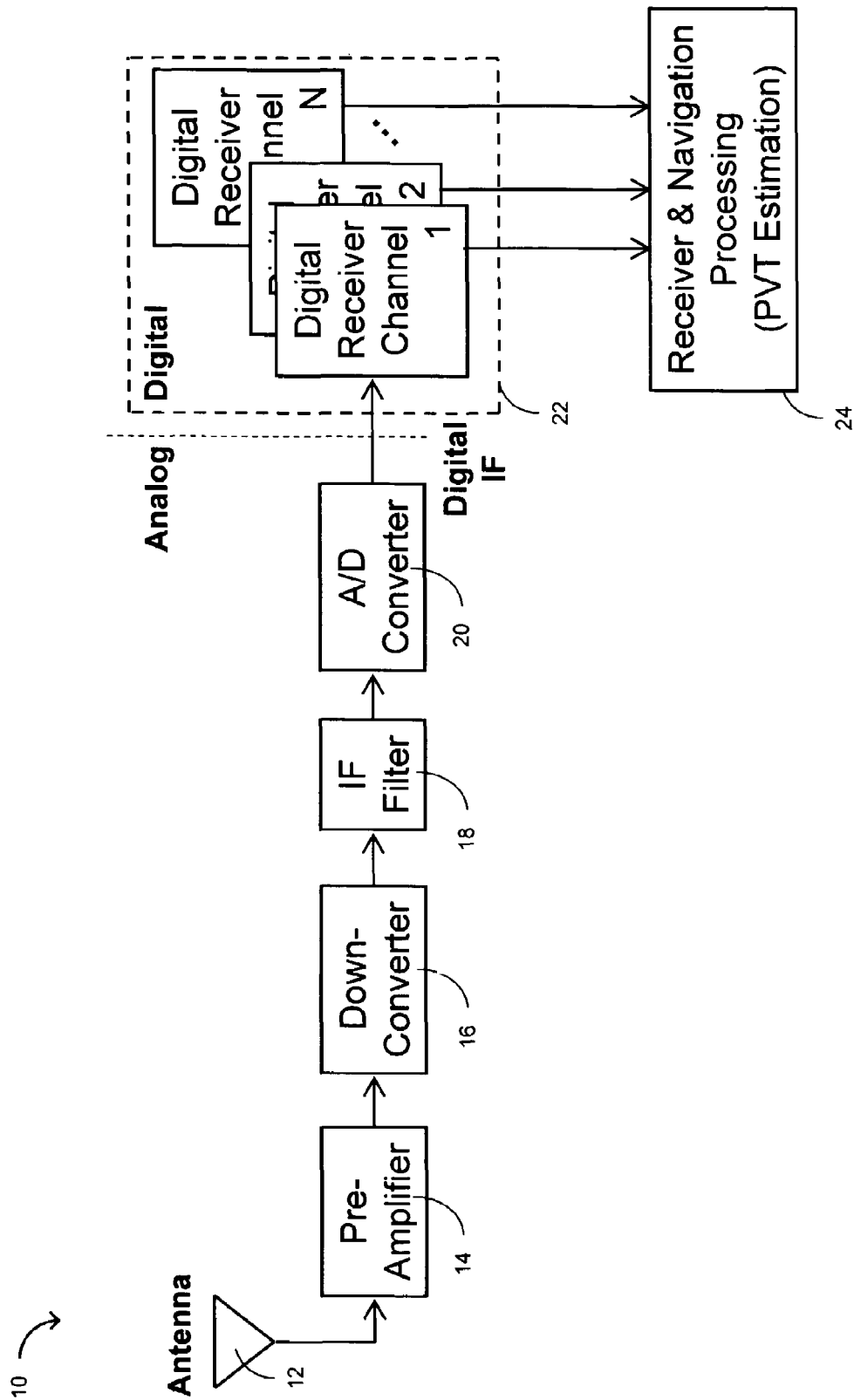
FIG. 1 is a block diagram of a prior art GPS receiver including a digital receiver channel.
Figure 2:
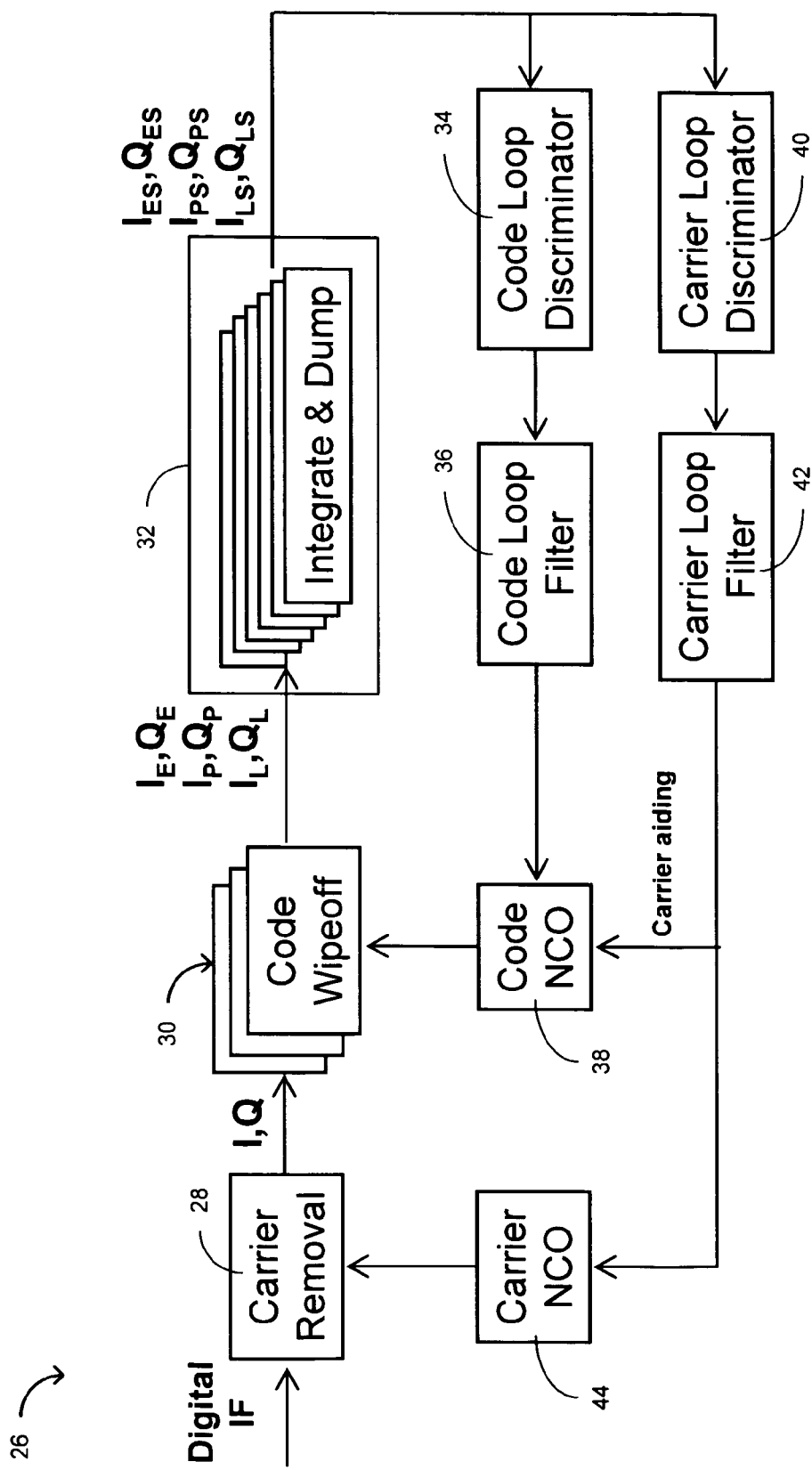
FIG. 2 is a block diagram illustrating the carrier and code tracking loops in the digital receiver channel of FIG. 1.
Figure 3:
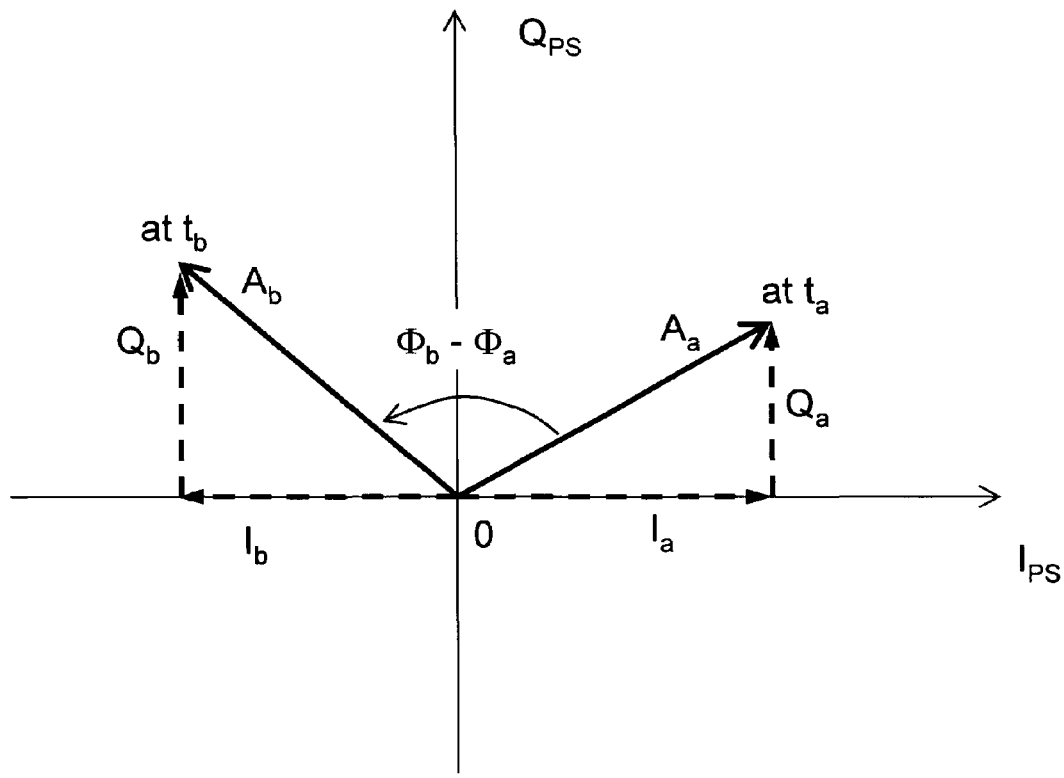
FIG. 3 is a phasor diagram illustrating a prior art method of estimating the frequency error in a frequency lock loop.

In one embodiment of the present invention, a method of estimating the frequency error in an FLL substantially improves the quality of frequency error estimates to decrease the bit error rate in data demodulation and increase the signal tracking sensitivity.

In another embodiment of the present invention, a method of demodulating GPS navigation data bits for GPS receivers with the carrier tracking loop implemented as an FLL is disclosed. An FLL update time, longer than a one-bit time duration, such as 100-ms, is used so that a FLL discriminator can estimate the frequency error based on multiple shorter-time (e.g., 10 ms and 20 ms) coherent integration samples by an averaging method. This FLL update rate depends on specific applications and different receiver designs. In most GPS applications, an update rate of every 100 ms or 200 ms is currently considered a reasonable number to meet both the dynamic and the sensitivity requirements and is accordingly used herein as examples and should be viewed as such.

As will be discussed in further detail shortly, estimation of frequency error is performed by maximally utilizing different coherent integration in-phase (I) and quadrature (Q) samples within and across bit durations. Long (till up to 20 ms) integrated samples are constructed (or generated) by summing up short integrated I and Q samples in software. That is, k samples are generated of integrated $I_k$ and $Q_k$ samples extending, in time interval, longer than the rate at which they were integrated by an integration and dump circuit preceding the carrier tracking loop. In one example of long integrated sample, 20 ms samples are generated when the integrate and dump circuit delivers 10 ms samples. The longer integrated samples have a higher signal-to-noise ratio but allow the FLL only to pull-in a smaller range of frequency errors. This embodiment of the present invention utilizes short-time coherent integration samples for achieving a wide range of pull-in frequency errors while maintaining high tracking sensitivity offered by long-time coherent integration samples.

As will be discussed in further detail shortly, in one embodiment of the present invention, an initial estimate of an FLL frequency error is obtained by averaging phase rotations between each pair of neighboring I and Q samples within the same data bit intervals, the estimate being insensitive to bit transitions.

In another embodiment of the present invention, the quality of the frequency error estimate is improved by selectively utilizing pairs of samples across bits, both short- and long-time integrated. Since phase difference between each pair of I and Q samples across a bit edge may have a $\pi$ phase shift ambiguity due to a possible bit transition, each pair of short-time integrated samples is checked as to whether it contains a bit transition based on the initial frequency error estimate and each pair of long-time integrated samples is checked as to whether it contains a bit transition based on the improved frequency error estimate. If either a bit transition or no bit transition is 'validly' determined in spite of the presence of noise, the corresponding pair of samples are utilized to further improve the frequency error estimate.

In yet another embodiment of the present invention, long coherently integrated samples are preferred to short integrated ones. If there are enough pairs of long integrated two neighboring phase angle samples whose phase shift ambiguities can be firmly resolved, the frequency error will be estimated based on valid long integrated sample data.

In another embodiment of the present invention, bits are demodulated based on the long integrated sample data.

In yet another embodiment of the present invention, the data demodulation method may selectively use the estimated phase rotation based on whether the channel is in a steady state tracking mode or not. If a channel is in a steady state tracking mode, the phase angle rotation should be very small and zero degree phase angle rotation is assumed in the data demodulation; otherwise, the estimated frequency error needs to be considered in the data demodulation.

It should be noted that various embodiments of the present invention can be used in GPS receivers using FLL in different applications, such as electronic hand-held devices, mobile telephones, automobiles and other applications in the industry.

Figure 5:
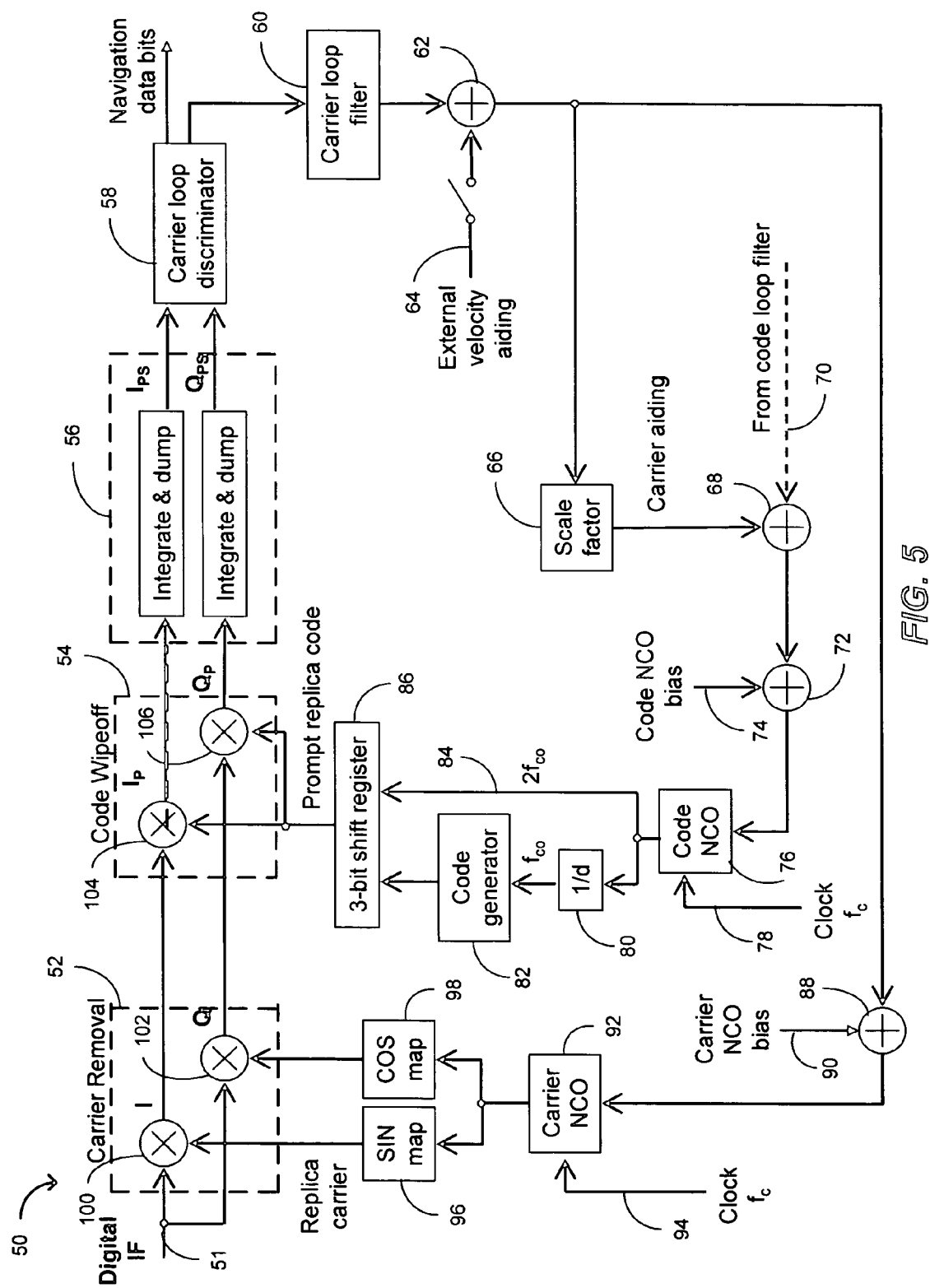
FIG. 5 shows a block diagram to include a carrier tracking loop 50, in accordance with an embodiment of the present invention.

Now referring to FIG. 5, a block diagram is shown to include a carrier tracking loop 50, a carrier removal block 52, a code wipeoff block 54, an integrate and dump block 56, a carrier loop discriminator block 58, a carrier loop filter block 60, an adder (or summer, 'adder' and 'summer' are used interchangeably herein) 62, an adder 72, an NCO block 76, a divide-by-d block 80, a shift register block 86, a carrier bias adder 88, a carrier NCO block 92, a scale factor block 66, in accordance with an embodiment of the present invention. The loop 50 receives, as input, a digital IF signal 51, which is generally, generated by an A/D converter, much the same as the one discussed with reference to prior art techniques. The loop 50 can be implemented as an FLL by calculating the frequency error and removing the same to achieve frequency carrier lock. The loop 50, implemented as a FLL, in one application, is a part of a GPS receiver. The loop 50 may also be a PLL.

The carrier removal block 52 is shown coupled to a code wipeoff block 54, which is shown coupled to the integrate and dump block 56. The block 56 is shown coupled to the carrier loop discriminator block 58, which is shown coupled to a carrier loop filter block 60, which provides one of the inputs to the adder 62, which receives a second input, selectively, from an external velocity aiding signal 64. The output of the adder 62 is provided as input to the scale factor block 66. The block 66 provides input to an adder 68, which receives another input, a code loop filtered phase signal 70 that is the output of a code loop filter block, not shown. It should be noted that the embodiments of the present invention are in connection with the carrier tracking loop of a GPS receiver and while a GPS receiver generally also includes a code tracking loop, as discussed earlier, it is not discussed relative to the various embodiments of the present invention. Th signal 70 is generated by such a code tracking loop.

The output of the adder 68 is provided, as input, to the adder 72, which also receives, as input, a code NCO bias signal 74, which is also generated by a code tracking loop, not shown. The output of the adder 72 is shown provided as input to the code NCO block 76, which is driven by the receiver clock signal ($f_c$) 78. The output of the block 76 is shown coupled to the divide-by-d block 80 and the shift register block 86, through the $2f_{co}$ signal 84. The output of the adder 62 is shown to be provided as input to the carrier frequency bias adder 88, which also receives input, the carrier NCO bias signal 90, from a carrier tracking loop. The output of the adder 88 is shown provided, as input, to the carrier NCO block 92, which is also driven by the receiver clock signal $f_c$ 94. The $f_c$ clock signals 94 and 78 are the same receiver clock signal.

The output of the block 92 is provided as input to both the SIN map block 96 and the COS map block 98. SIN refers to a receiver generated sinusoidal carrier signal and COS refers to a cosine carrier signal. The output of the blocks 96 and 98 are provided to the carrier removal block 52. Specifically, the mixer 100 of the block 52 receives the output of the block 96 and the mixer 102 of the block 52 receives the output of the block 98. Thus, the mixer 100, having multiplied the digital IF signal 51 with the output of the block 96, generates an in-phase (I) signal and the mixer 102, having received the output of the block 98 and multiplied by the digital IF signal 51, generates the quadrature (Q) signal. The I signal is provided to the multiplier 104 of the code wipeoff block 54, which multiplies the I signal with the receiver generated prompt PRN code from the block 86 to generate the Ip signal to the block 56. The Q signal is provided to the multiplier 106 of the block 54 for multiplication thereof with the receiver generated prompt PRN code from the block 86 and generation of the $Q_p$ signal to the block 56. The block 56 receives the $I_p$ and $Q_p$ signals as input and processes the same to generate the $I_{ps}$ and $Q_{ps}$ therefrom, respectively.

During operation, the loop 50 acts to adjust the frequency of the receiver generated carrier signals from blocks 96 and 98, to match the frequency of the received carrier signal, or the signal 51, and to continue to adjust the frequency of the signals from blocks 96 and 98 to achieve such matching. It should be noted that that while an exact match is the goal, practically, there is not an exact match, rather, there is a substantially close match and the reason for the inability to obtain an exact match is, for example, the presence of noise in circuits, satellite motion, user dynamic, and loop filter feedback delay and others. In fact, the mismatch between the frequencies of the incoming signal 51 and of the receiver generated carrier signal is what is referred to as the frequency error.

One of the applications, among many, of the carrier tracking loop 50 of FIG. 5, is in a digital CDMA spread spectrum receiver, such as a GPS receiver.

The frequency of the signal 51 changes as the receiver moves, which GPS receivers generally do in operation. That is, as the receiver moves, the frequency of the received carrier signal shifts or changes due to Doppler affects. The FLL tends to keep this frequency error small. Frequency error is calculated by finding the rotation of the phase angle of $I_{ps}$ and $Q_{ps}$ samples and dividing this rotation by the difference in time. For example, assuming a span of time to be 10 milli seconds (ms), the phase rotation is divided by 10 ms to determine the frequency error.

To achieve carrier lock, the block 92, driven by the receiver clock signal 94, generates a periodic signal whose frequency is considered to match the frequency of the incoming signal 51. SIN map 96 and COS map 98 turn this periodic signal into sine and cosine wave at this frequency. They are used to completely remove the incoming signal's carrier by the block 52 when these two frequencies exactly match. Block 52 generates the I and Q signals as it mixes the receiver generated carrier replica with the incoming signal. Addition of the signal 90 by the adder 88 serves to compensate for any carrier NCO bias that may exist. The block 76 works much in the same way as the block 92 but it serves to lock to the code phase rather than the carrier frequency and its output is divided by 'd', which is used to generate PRN code, by the block 82, to the block 86 where the generated code is shifted to form early, prompt and late versions of the PRN code. If the phase of the prompt PRN code matches the incoming signal's PRN code phase, then the PRN code in the incoming I and Q signals will be removed by the block 54.

A potential code bias is compensated for by adding the signal 74 to the output of the adder 68 for generation of a signal to the block 76. The block 66 serves to scale its input so that the carrier aiding can be used in code tracking loop. The carrier loop filter 60 serves to filter the frequency error output of the block 58. The block 56 integrates each of the Ip and Qp samples over a known or predetermined period of time and dumps or provides the integrated results, as Ips and Qps, respectively. Coherent integration is performed over a predetermined time period, such as, for example, 10 ms. Coherent integration is the time domain integration over multiple correlation measurements from I and Q channels. For example, like Equations (5) and (6), $I_k$ and $Q_k$ are coherently integrated from 10 ms $I_{ka}$, $I_{kb}$, $Q_{ka}$, and $Q_{kb}$ samples.

Of particular importance is the block 58 because, in one embodiment of the present invention, the block 58 serves to utilize only "valid" samples and to average all possible samples to obtain an accurate phase angle rotation estimate. That is, in the case of BPSK modulation, the averaged phase angle rotation is calculated in such a way so as to avoid the use of invalid phase angle rotation samples. All phase angle rotation samples should be nearly consistent with each other, after considering possible bit transitions. Those phase angle rotation samples that seem inconsistent are to be declared as "invalid" and thus not used. More specifically, there are several scenarios presenting different phase differences, as illustrated and discussed relative to FIG. 6.

FIG. 6 shows coherent integration $I_{PS}$ and $Q_{PS}$ samples in one update period of an FLL filter. The example given in this figure assumes that the loop filter updates every 100 ms and that the receiver coherent integration time $T_{PDI}$ is 10 ms in the scenarios 107 and 108. In one embodiment, through the use of software, although other methods may be used to achieve the same, 20-ms coherent integrated samples are constructed (or generated) in the scenario 110. The selection of the loop filter update rate and the coherent integration time $T_{PDI}$ largely depends on the receiver design and different signal strength condition, and obviously, other values of these two time parameters may be employed. The data demodulation method of the present invention also assumes that the receiver has detected data bit edges. Typically, a channel will not start tracking and decoding bits before the bit edges are detected. Thus, in this example, the receiver circuit collects ten pairs of 10-ms $I_{PS}$ and $Q_{PS}$ samples every FLL filter update (in scenarios 107 and 108), i.e., $(I_{ka}, Q_{ka})$ and $(I_{kb}, Q_{kb})$ with k=1, 2, ..., 5. Then, 5 samples of 20 ms (in scenario 110) are then constructed using software or other techniques.

The GPS satellites broadcast navigation data with a rate of 50 bits per second (bps), or equivalently, 20 ms long per bit. Accordingly, two neighboring pairs, $(I_{ka}, Q_{ka})$ and $(I_{kb}, Q_{kb})$, with the same k, are samples taken within the same bit interval. One 100-ms period contains five bits that are to be demodulated.

For each pair of 10-ms $I_{PS}$ and $Q_{PS}$ samples, the phase angle can be calculated as follows:

$$\Phi_{ka} = \tan^{-1}\left(\frac{Q_{ka}}{I_{ka}}\right) \qquad \text{Equation (1)}$$

$$\Phi_{kb} = \tan^{-1}\left(\frac{Q_{kb}}{I_{kb}}\right) \qquad \text{Equation (2)}$$

with k =1, 2, ..., 5. Their phase difference $\Delta\Phi_{kab}$ is:

$$\Delta\Phi_{kab} = \Phi_{kb} - \Phi_{ka} \qquad \text{Equation (3)}$$

with k=1, 2, ..., 5. Since $\Phi_{ka}$ and $\Phi_{kb}$ are phase angles within the same bit interval, any bit transitions have no effect on this calculated phase rotation $\Delta\Phi_{kab}$.

The value of $\Phi_{ka}$ and $\Phi_{kb}$, returned from $\tan^{-1}$ function, is in the range of to $-\pi$ to $\pi$. The phase difference $\Delta\Phi_{kab}$ is limited to within the range of $-\pi$ to $+\pi$. In other words, the frequency error is assumed to be in the range of +/− half a cycle every 10 ms, or equivalently ±50 Hz, as stated previously. If the actual frequency error is beyond this limited range, then the FLL will be unable to track the signal. When this case happens loss of signal tracking is detected by other parts of the receiver tracking loops, then, the receiver tends to reacquire the signal. When $\Delta\Phi_{kab}$ is positive, the carrier phase rotates in the counter-clockwise direction; otherwise, the phase rotates in clockwise direction.

In FIG. 6, two other types of phase angle rotations, namely, $\Delta\Phi_{kba}$ and $\Delta\Phi_k$ are indicated and advantageously employed. Properly using rotations $\Delta\Phi_{kba}$ and $\Delta\Phi_k$ across bits, together with $\Delta\Phi_{kab}$, not only is noise reduced in frequency error estimates but also an opportunity is presented to demodulate data bits.

Figures 7A, 7B:
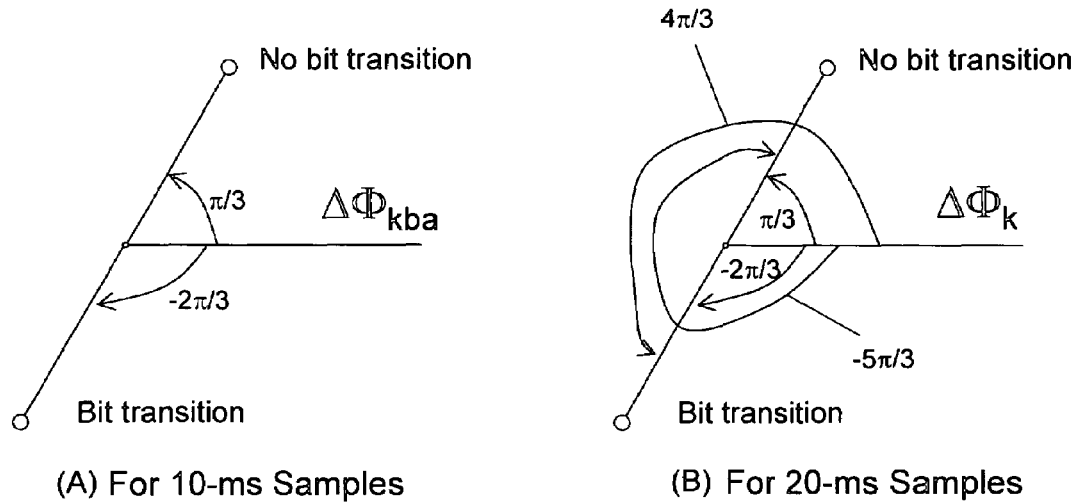
FIG. 7(a) is a phasor diagram illustrating the phase ambiguities existing in phase rotations $\Delta\Phi_{kba}$ for the case of using 10 ms samples.
FIG. 7(b) is a phasor diagram illustrating the phase ambiguities existing in phase rotations $\Delta\Phi_k$ for the case of using 20 ms samples.

$\Delta\Phi_{kba}$ is the difference between phase angle $\Phi_{ka}$ from the first 10-ms sample of bit k and phase angle $\Phi_{(k-1)b}$ from the second 10-ms of bit k-1, i.e., $$\Delta\Phi_{kba} = \Phi_{ka} - \Phi_{(k-1)b} \quad \text{Equation (4)}$$

with k=1, 2, . . . , 5, where $\Phi_{0b}$ is provided from a previous FLL filter update. With the same maximum frequency error assumption, the range of $\Delta\Phi_{kba}$ is also limited to −π to +π. If there is no transition from bit k-1 to bit k, $\Delta\Phi_{kba}$ represents a phase rotation in 10 ms, just as $\Delta\Phi_{kab}$ does. If there is a bit transition, then $\Delta\Phi_{kba}$ contains a π (or equivalently −π) phase shift. Since bit transitions are unknown, all calculated $\Delta\Phi_{kba}$ may have a ±π phase ambiguity. For example, if $\Delta\Phi_{kba}$ is π/3, then the actual phase can rotate either π/3 in the counter-clockwise direction, or 2π/3 in the clockwise direction, as shown in FIG. 7(a).

While both $\Delta\Phi_{kab}$ and $\Delta\Phi_{kba}$ are from 10-ms samples, phase difference $\Delta\Phi_k$ is from 20-ms samples. Typically, 10-ms integrated samples ($I_{ka}$, $Q_{ka}$, $I_{kb}$, and $Q_{kb}$) are provided by the block 56 of FIG. 5. Longer coherently-integrated $I_{PS}$ and $Q_{PS}$ samples can be used, as long as the total coherent integration time is no longer than one bit interval, i.e., 20 ms. k samples are generated of integrated $I_k$ and $Q_k$ samples extending, in time interval, longer than the rate at which they were integrated by an integration and dump circuit preceding the carrier tracking loop. In one example of long integrated sample, 20 ms samples are generated when the integrate and dump circuit delivers 10 ms samples. In FIG. 6, 10-ms $I_{PS}$ and $Q_{PS}$ samples are coherently summed or added within the same bits to obtain 20-ms samples, i.e., $$I_k = I_{ka} + I_{kb} \quad \text{Equation (5)}$$

$$Q_k = Q_{ka} + Q_{kb} \quad \text{Equation (6)}$$

with k=1, 2, . . . , 5. Accordingly, the carrier phase angle of a 20-ms sample pair ($I_k$, $Q_k$) is equal to:

$$\Phi_k = \tan^{-1}\left(\frac{Q_k}{I_k}\right) \quad \text{Equation (7)}$$

Similarly, the phase differences $\Delta\Phi_k$ are $$\Delta\Phi_k = \Phi_k - \Phi_{k-1} \quad \text{Equation (8)}$$

The values of $\Phi_k$ and $\Delta\Phi_k$ are also limited to the range of −π to +π, after performing a modulo of 2π operation.

Like $\Delta\Phi_{kba}$, phase difference samples $\Delta\Phi_k$ also have a π phase shift ambiguity caused by possible bit transitions, however, samples $\Delta\Phi_k$ are smoother than $\Delta\Phi_{kab}$ and $\Delta\Phi_{kba}$. This is because the noise in 20-ms integrated $I_k$ and $Q_k$ samples is theoretically 3 dB lower than in the one in 10-ms $I_{ka}$, $Q_{ka}$, $I_{kb}$ and $Q_{kb}$ samples. If the phase ambiguity problem can be resolved, the frequency error estimation and data modulation should always prefer 20-ms sample data to 10-ms sample data.

Unfortunately, in addition to π phase shift ambiguity, $\Delta\Phi_k$ samples have another ambiguity, i.e., phase rotation direction ambiguity. Since the FLL assumes that the carrier phase can rotate from −π to +π within 10 ms, it can then rotate from −2π to +2π within 20 ms. For example, if $\Delta\Phi_k$ is equal to π/3 and if there is no transition from bit k-1 to bit k, the actual phase can rotate either π/3 in the counter-clockwise direction or 5π/3 in the clockwise direction, as shown in FIG. 7(b). Together with the π phase shift ambiguity, the actual phase rotation can be any one of the following four valid possibilities: −5π/3, −2π/3, π/3, and 4π/3. Therefore, it is more difficult to utilize the smoother 20-ms samples.

In FIG. 6, three scenarios 107, 108 and 110 are presented. To provide perspective, the block 58 of FIG. 5 calculates a phase difference, i.e., estimates the frequency error, every 100 ms using ten pairs of 10-ms Ips and Qps samples. As previously discussed, phase difference between two neighboring pairs of phase samples divided by their time difference determines frequency error, which is performed by the block 58 and the output of the block 58, while navigation data bits are also the output of the loop 50, (decoded bits are not the input to block 60), when the loop 50 is used in GPS receivers. During 100 ms, per FLL update, 10 samples of 10 ms Ips and 10 samples of 10 ms Qps are accumulated. It should be noted that while fixed values of time are provided herein, this is only done by way of example and it should be noted that other time periods or times may be employed without departing from the scope and spirit of the present invention. In FIG. 6, Φ refers to a carrier phase angle, thus, $\Phi_{1a}$ refers to the carrier phase angle of the first 10 ms sample for bit 1 while $\Phi_{1b}$ refers to the carrier phase angle of the second 10 ms sample for bit 1 and $\Phi_{2a}$ refers to the carrier phase angle of the first 10 ms sample for bit 2 and $\Phi_{2b}$ refers to the carrier phase angle of the second 10 ms sample for bit 2 and so on. $\Phi_1$, . . . $\Phi_n$ each refers to the phase angle of a particular 20 ms sample, 1 . . . n. Index 0 is used to indicate bit 5 from the previous FLL update.

FIG. 6 shows three types of angle rotations among these are ten 10 ms-phase angle samples and five 20 ms-phase angle samples every 100 ms. In scenario 107, angle rotation $\Delta\Phi_{kab}$ does not cross any bit edge, so there is no bit transition or bit ambiguity in this particular scenario. $\Delta\Phi_{kba}$ in scenario 108 and $\Delta\Phi_k$ in scenario 110 cross bit edges. Although scenario 110 also utilizes angle rotations across bit edges as does scenario 108, 20 ms samples in scenario 110 have a higher signal-to-noise (SNR) than the 10 ms samples in scenario 108. While all phase rotations across bit edges have a problem of π phase ambiguity, the values of 20 ms angle rotations can be between −2π and 2π which leads to the rotation direction ambiguity as discussed before and also seen in FIGS. 7(a) and (b).

At every FLL update (100 ms), 10 ms I and Q samples are dumped or provided by the block 56 to the block 58 (of FIG. 5) and then their phase angles and differences are calculated and processed, as shown in FIG. 6.

As previously noted, a carrier tracking loop, based on a discriminator function, is often implemented as either a Costas phase lock loop (PLL) or a frequency lock loop (FLL). The PLL loop discriminator outputs phase error and is accurate to track carrier phase change. However, the PLL is so sensitive to dynamics stress that it often results in cycle slips and may lose track even for relatively strong signals.

Instead of phase error, the FLL discriminator produces frequency error that is the difference between the receiver's locally-generated carrier frequency and the actual received carrier signal frequency. By measuring a delta (or difference) in carrier phase angles instead of measuring carrier phase angles, the FLL is able to more robustly tolerate frequency errors and therefore dynamic stress that causes the frequency errors.

FIG. 5 shows that the carrier tracking loop can be used to demodulate navigation data bits as by-products. A PLL tends to lock on carrier phase typically by maximizing $I_{PS}$ amplitude; therefore, data demodulation in the PLL is equivalent to easily detecting the sign of the integrated $I_{PS}$. Unfortunately, data demodulation in the FLL is more complicated than in the PLL, since it depends tightly on the noisy estimate of the frequency error. In order to improve the quality of frequency error estimates, the FLL could utilize phase differences across bits, but unknown bit transitions that cause a $\pi$ carrier phase shift make the utilization difficult. In GPS, navigation data use the binary phase shift keying (BPSK) mechanism to modulate signal carriers. When there is a bit transition, for example, either from bit 0 to bit 1 at an example time of 20 ms, or from bit 1 to bit 0 at an example time of 60 ms as shown in FIG. 4, the signal carrier phase will have a $\pi$ shift. If a demodulation method estimates the frequency error by only utilizing samples within bits while giving up sample information across bits, the estimate will be noisy and less than optimal. Noisy frequency error estimate will cause a high bit error rate (BER) in data demodulation. On the other hand, the FLL has difficulties in utilizing samples across bits, since if they are improperly utilized, unknown bit transitions and 180-degree ($\pi$) carrier phase shifts could result in a totally wrong frequency error estimate.

As discussed before, FIGS. 7(a) and 7(b) show phase diagrams for the case of using 10 ms samples and the case of using 20 ms samples, respectively, in a FLL, such as the one shown in FIG. 5. In FIG. 7(a), due to the use of 10 ms samples, such as scenario 108 of FIG. 6, a bit transition, in an application employing BPSK for modulation and demodulation, results in a phase shift of $\pi$. That is, the phase rotation is within the range of $-\pi$ to $\pi$. In FIG. 7(b), due to the use of 20 ms samples, such as scenario 110 of FIG. 6, a bit transition, in an application employing BPSK for modulation and demodulation, results in a phase shift of $2\pi$. In the example provided herein, the FLL can tolerate +/−50 Hz frequency errors, which corresponds to $-\pi$ to $+\pi$ phase rotation during 10 ms. Due to unknown bit transitions, all phase angles and angle rotations are expressed in the range from $-\pi$ to $+\pi$ without losing generality.

Figure 8:
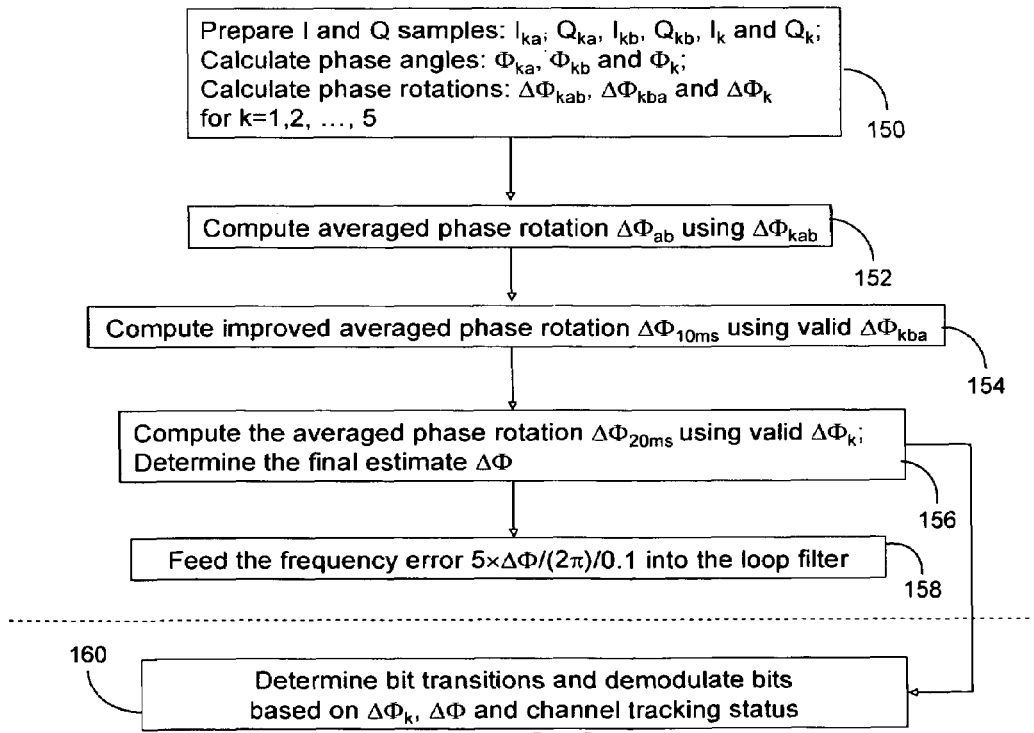
FIG. 8 shows a flow chart illustrating some of the steps performed in data demodulation using one of the methods of the present invention.

Now referring to FIG. 8, a flow chart illustrates some of the steps performed in frequency error estimation and data demodulation using one of the methods of the present invention. The method, as shown in FIG. 8, consists basically of two parts, i.e., phase angle rotation or frequency error estimation, followed by bit transition determination and data demodulation. In the first part, an accurate phase rotation estimate is obtained by maximally utilizing all valid sample data. Once the phase angle rotation is estimated, the data demodulation, in part two, performed. The phase angle rotation estimation, in part one, does not depend on the data demodulation in part two. They are decoupled, so the receiver could still track very weak signal even if correct data demodulation is not achieved.

In FIG. 8, in step 150, the I and Q samples are received by the block 58 of FIG. 5 and the phase angles $\Phi_{ka}$, $\Phi_{kb}$ and $\Phi_k$ and their differences (sometimes referred to as phase rotation), $\Delta\Phi_{kab}$, $\Delta\Phi_{kba}$, and $\Delta\Phi_k$ are calculated, in accordance with the equations provided hereinabove. Referring to the previous example, 10-ms integrated samples $I_{ka}$, $Q_{ka}$, $I_{kb}$, and $Q_{kb}$, with k=1, 2, . . . , 5 are collected. Typically, they are the outputs of the GPS receiver integrate and dump circuits or block 56 of FIG. 5. Then, 20-ms samples $I_k$ and $Q_k$ are constructed (or generated) using Equations 5 and 6, with k=1, 2, . . . , 5. The generation of 20 ms samples is done in software, in one method of the present invention.

In step 150, further, carrier phase angles $\Phi_{ka}$, $\Phi_{kb}$ and $\Phi_k$ are calculated using Equations 1, 2 and 7, respectively, with k=1, 2, . . . , 5. All these phase angles, returned from $\tan^{-1}$ function, are in the range of $-\pi$ to $+\pi$.

Phase rotations $\Delta\Phi_{kab}$, $\Delta\Phi_{kba}$ and $\Delta\Phi_k$ are calculated by differencing two corresponding neighboring phase angles, with k=1, 2, . . . , 5. Equations 3, 4 and 8 are used, respectively. All phase rotations are modulated by $2\pi$ so that their values are also in the range of $-\pi$ to $-\pi$. It should be understood however, that limiting the range as such is merely an example and other ranges may be used to similarly limit the range and such as example is the phase angle and phase rotation ranging from $-2\pi$ to $2\pi$. At the beginning, it is not known whether a phase difference sample should be in the range of $-2\pi$ to 0 or in the range of 0 to $2\pi$. A calculated rotation sample of $-1.5\pi$ may really mean $0.5\pi$ and it is not known that where there is a bit transition, if a phase $\pi$ should be added or subtracted. But since the value is limited in range it does not matter what the case is in the beginning as the true value is determined at a later time. Initial angles $\Phi_{0a}$ $\Phi_{0b}$ and $\Phi_0$ were saved from the last FLL update.

Next, at step 152, an estimate of phase rotation $\Delta\Phi_{ab}$ is computed by averaging $\Delta\Phi_{kab}$, i.e., $$\Delta\Phi_{ab} = \frac{1}{5}\sum_{k=1}^{5} \Delta\Phi_{kab} \qquad \text{Equation (9)}$$

In other words $\Delta\Phi_{ab}$ is the averaged phase angle rotation per 10 ms, and it does not depend on the data bit pattern. Since $\Delta\Phi_{kba}$ and $\Delta\Phi_k$ contain phase shift ambiguities, their use is avoided at this point. Equation (9) assumes that the carrier phase rotates with a relative constant speed during 100 ms, which is a reasonable assumption in most of GPS applications since the FLL NCO frequency is not adjusted during this 100-ms interval. The FLL update rate is determined based on the application and receiver design. The method of the current invention uses the averaged phase rotation rate to predict phase angles. When a different FLL update rate is used, the principle of averaging remains the same. Double differencing phase angles seem to be able to estimate phase rotation acceleration, but in fact, they are usually extremely noisy and not adopted in this invention.

Figure 9:
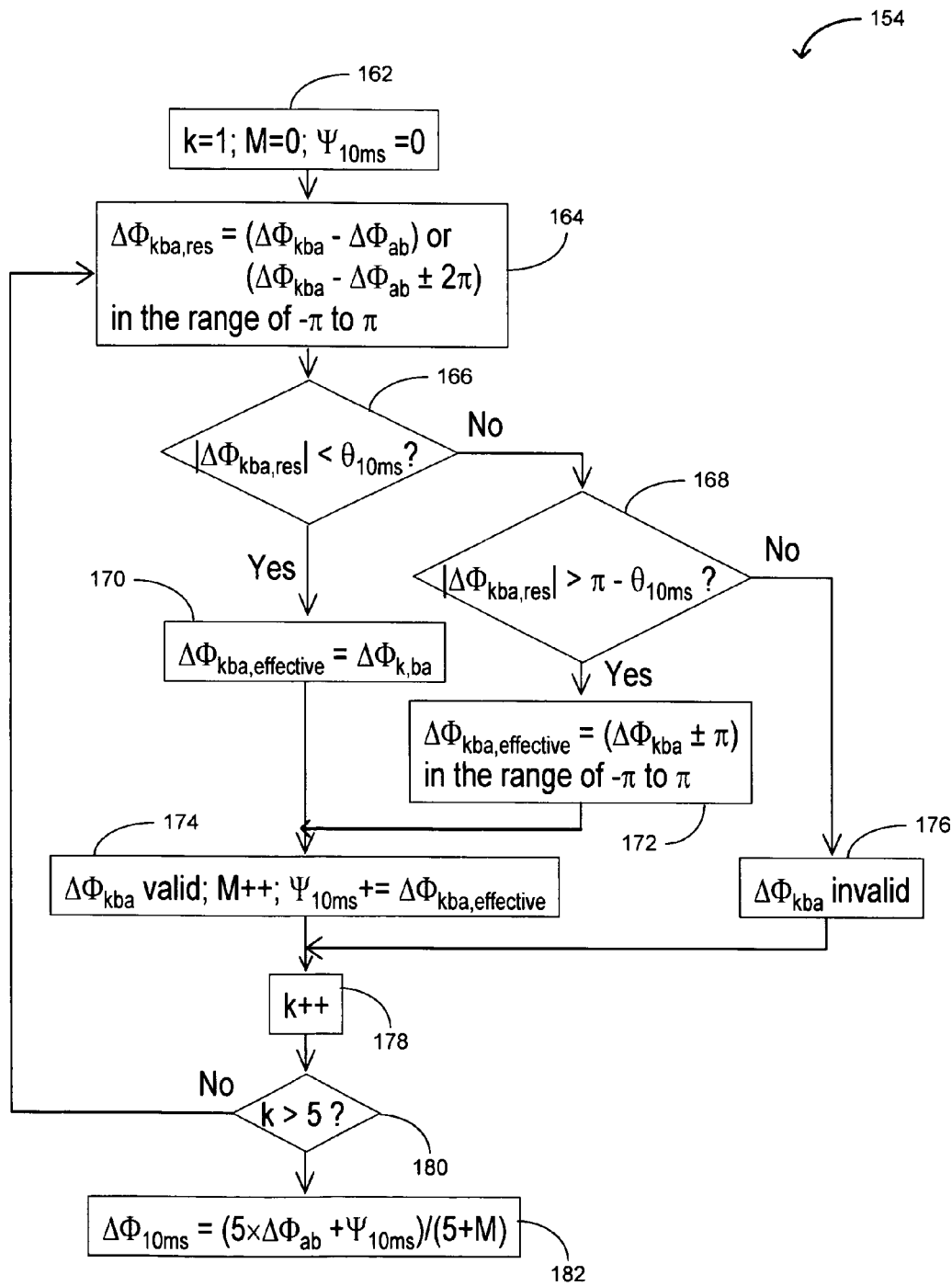
FIG. 9 is a flow chart illustrating the steps used in step 154 of FIG. 8.

Next, at step 154, with the use of a phase angle rotation estimate from step 152, the $\Delta\Phi_{kba}$ is selectively utilized to further improve the quality of the averaged phase angle rotation estimate. FIG. 9 illustrates this step in further detail. Since $\Delta\Phi_{kba}$ has a $\pi$ phase shift ambiguity, this ambiguity problem should be resolved first before $\Delta\Phi_{kba}$ can be utilized. If the phase shift ambiguity associated with a $\Delta\Phi_{kba}$ sample is difficult for resolution due to, for example, weak signal or an intolerable amount of noise, this sample is given up and considered 'invalid' for use. The step 154 is not going to demodulate bits, so it does not have to resolve each bit transition. In order to determine whether there is a bit transition, the averaged rotation $\Delta\Phi_{ab}$ is subtracted from the sample 'valid' sample rotation $\Delta\Phi_{kba}$ first, i.e., $$\Delta\Phi_{kba,res} = (\Delta\Phi_{kba} - \Delta\Phi_{ab}) \text{ or } (\Delta\Phi_{kba} - \Delta\Phi_{ab} \pm 2\pi) \qquad \text{Equation (10)}$$

where "$\pm 2\pi$" represents the operation of modulo of $2\pi$ and the value of $\Delta\Phi_{kba,res}$ is then in the range of $-\pi$ to $+\pi$. Only noise and a possible $\pi$ phase shift are supposed to remain in the residual angle $\Delta\Phi_{kba,res}$. Then, $|\Delta\Phi_{kba,res}|$ is compared to a threshold $\theta_{10ms}$ to determine whether there is a $\pi$ phase shift. As also shown graphically in FIG. 10, if $|\Delta\Phi_{kba,res}|$ is less than $\theta_{10ms}$, then no bit transition is believed to exist, and $\Delta\Phi_{kba}$ is declared 'valid' and will be used directly to improve the averaged phase angle rotation. If $|\Delta\Phi_{kba,res}|>\pi-\theta_{10ms}$, then $\Delta\Phi_{kba}$ is also valid but with a transition from bit k-1 to k, and $\Delta\Phi_{kba}$ with a compensation of $\pi$ phase shift will be used to improve the averaged phase angle rotation. For other values of $\Delta\Phi_{kba,res}$, the angle rotation $\Delta\Phi_{kba}$ is invalid and will not be used to improve the averaged phase rotation, since this rotation sample is too noisy to decide whether there is a bit transition or not. The typical value of threshold $\theta_{10ms}$ is around $\pi\times65°/180°$ although other suitable threshold values may be used.

For each 'valid' sample rotation $\Delta\Phi_{kba}$, an effective phase rotation $\Delta\Phi_{kba,effective}$, which will be actually used to improve the averaged phase angle rotation, is defined as:

$$\Delta\Phi_{kba,effective}=\Delta\Phi_{kba} \text{ or } (\Delta\Phi_{kba}\pm\pi) \qquad \text{Equation (11)}$$

where "$\pm\pi$" is used to compensate the $\pi$ phase shift if a bit transition has just been detected, and the absolute value of $\Delta\Phi_{kba,effective}$ in either case is less than $\theta_{10ms}$. Suppose there are a total of M valid $\Delta\Phi_{kba}$ samples, say, $\Delta\Phi_{1ba}, \ldots, \Delta\Phi_{Mba}$ are valid, then the improved averaged phase angle rotation $\Delta\Phi_{10ms}$ per 10 ms is equal to:

$$\Delta\Phi_{10ms} = \frac{1}{5+M}\left(5\times\Delta\Phi_{ab} + \sum_{k=1}^{M}\Delta\Phi_{kba,effective}\right) \qquad \text{Equation (12)}$$

The reason for selectively utilizing phase rotation samples $\Delta\Phi_{kba}$ is to safely improve the quality of the averaged phase angle rotation. Though this step had made some bit transition decisions, it is not the final step of data demodulation. As stated previously, the 20-ms sample data are preferred to be used in data demodulation.

In case that a bit transition in this step is resolved erroneously due to some large noise, the impact to the averaged phase angle rotation $\Delta\Phi_{10ms}$ would be still small, since the angle term $\Delta\Phi_{kba,effective}$ used in Equation 12 is quite close to the original average $\Delta\Phi_{ab}$. Later on, simulation results will show that $\Delta\Phi_{10ms}$ is almost always statistically better than $\Delta\Phi_{ab}$ in all signal strength levels, i.e., with a more accurate frequency error estimate and a lower demodulation BER.

Figure 11:
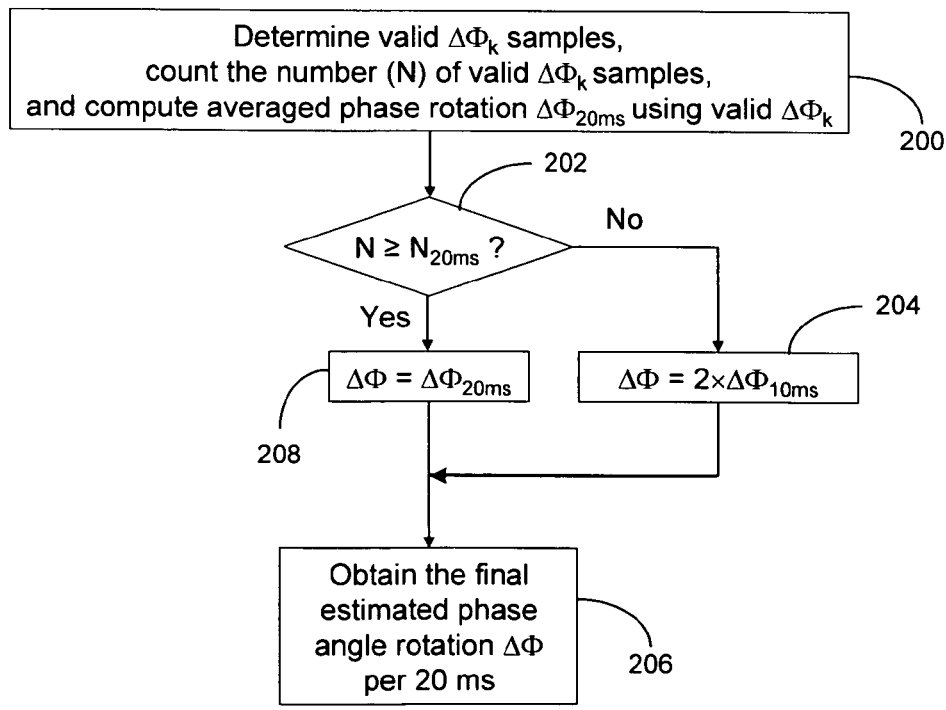
FIG. 11 is a flow chart illustrating the steps used in step 156 of FIG. 8.

At step 156, as shown in FIG. 11, this step first re-estimates the phase angle rotation $\Delta\Phi_{20ms}$ based on valid 20-ms $\Delta\Phi_k$ samples. The procedures of validation and estimation, which are quite similar to those in step 154, are shown in FIG. 12.

Figure 12:
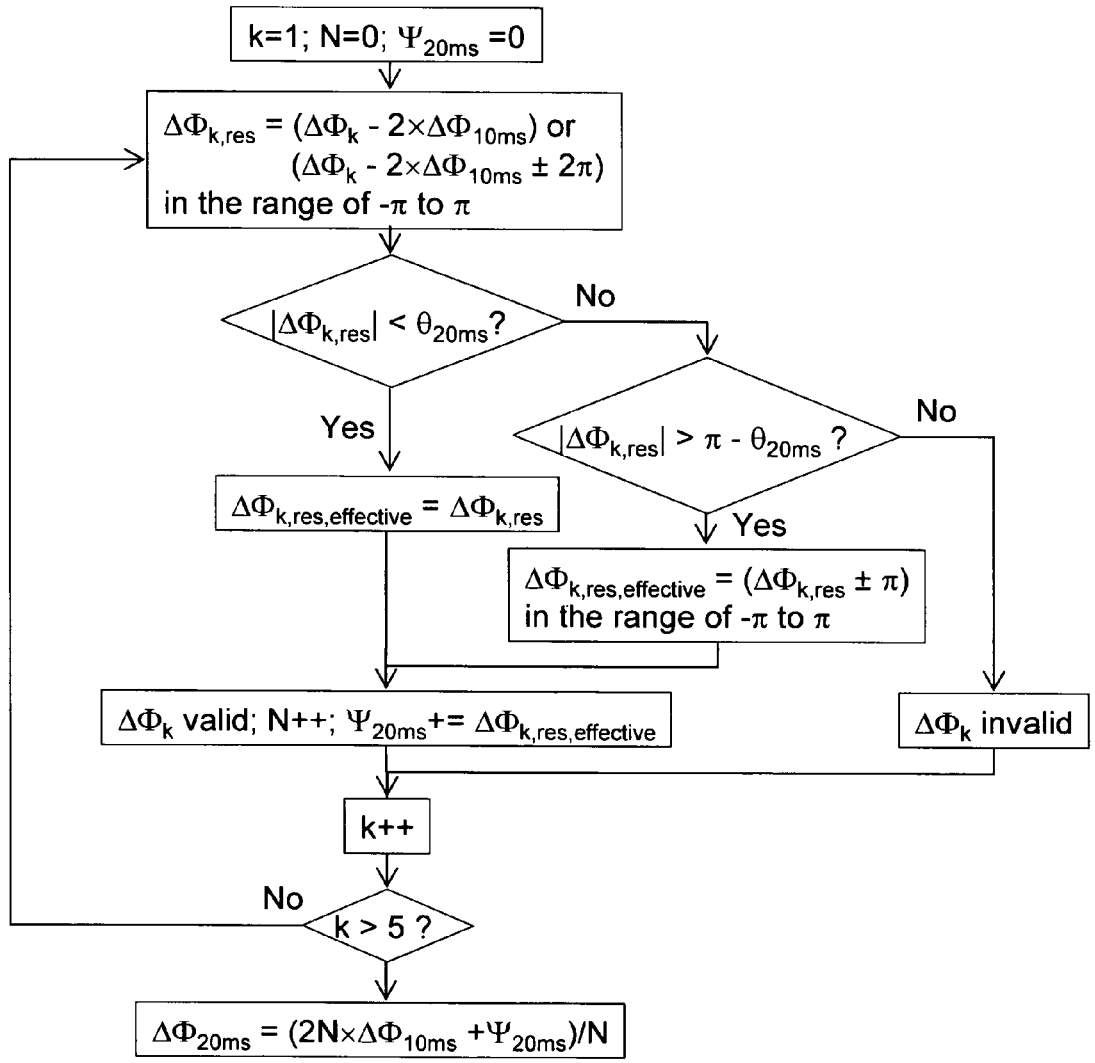
FIG. 12 is a flow chart illustrating the computation of the phase rotation estimate $\Delta\Phi_{20ms}$ based on valid 20-ms samples in the step 200 of FIG. 11.

As FIG. 12 shows, the estimated average rotation $2\times\Delta\Phi_{10ms}$ is first removed from each 20-ms sample $\Delta\Phi_k$, i.e., $$\Delta\Phi_{k,res}=(\Delta\Phi_k-2\times\Delta\Phi_{10ms}) \text{ or } (\Delta\Phi_k-2\times\Delta\Phi_{10ms}\pm2\pi) \qquad \text{Equation (13)}$$

where the residual angle $\Delta\Phi_{k,res}$ is in the range of $-\pi$ to $\pi$ after a module of $2\pi$. The value of $\Delta\Phi_{k,res}$ should be close to zero if noise in $\Delta\Phi_k$ is low and if the estimate $\Delta\Phi_{10ms}$ is quite accurate. By removing the estimated rotation angle $2\times\Delta\Phi_{10ms}$ and limiting the residual angle value in the range of $-\pi$ to $\pi$, the phase rotation direction ambiguity problem associated with $\Delta\Phi_k$ is automatically resolved.

Then, $\Delta\Phi_{k,res}$ is compared to another threshold $\theta_{20ms}$ in order to resolve $\pi$ phase ambiguity problem and validate $\Delta\Phi_k$. If $|\Delta\Phi_{k,res}|<\theta_{20ms}$ or $|\Delta\Phi_{k,res}|>\pi-\theta_{20ms}$, then $\Delta\Phi_k$ is declared to be valid and will be used to re-estimate the averaged phase rotation; otherwise, $\Delta\Phi_k$ is invalid. Meanwhile, this step keeps counting the number of valid $\Delta\Phi_k$ samples, N. A typical value of threshold $\theta_{20ms}$, which will be discussed later, is about $\pi\times70°/180°$.

Unlike valid $\Delta\Phi_{kba}$ that can be directly used in calculating the averaged phase rotation if it does not contain a bit transition, valid $\Delta\Phi_k$ cannot be directly used because of the phase rotation direction ambiguity problem even if it does not contain a bit transition. Instead, the present invention takes advantage of $\Delta\Phi_{k,res}$ that has resolved the phase rotation direction ambiguity. For each valid $\Delta\Phi_k$, its effective residual rotation angle is as follows:

$$\Delta\Phi_{k,res,effective}=\Delta\Phi_{k,res}, \text{ or } (\Delta\Phi_{k,res}\pm\pi) \qquad \text{Equation (14)}$$

where "$\pm\pi$" is used to compensate the $\pi$ phase shift if a bit transition has just been detected, i.e., $|\Delta\Phi_{k,res}|>\pi-\theta_{20ms}$. The absolute value of $\Delta\Phi_{k,res,effective}$ in either case is less than $\theta_{20ms}$. Based on N valid 20-ms $\Delta\Phi_k$ samples, a new averaged phase angle rotation $\Delta\Phi_{20ms}$ can be computed. Suppose samples $\Delta\Phi_1, \ldots, \Delta\Phi_N$ are valid, then $$\Delta\Phi_{20ms} = \frac{1}{N}\left(2N\times\Delta\Phi_{10ms} + \sum_{k=1}^{N}\Delta\Phi_{k,res,effective}\right) \qquad \text{Equation (15)}$$

Now turn back to FIG. 11 again. The integer number of valid 20-ms samples, N, is no more than five. In order to make sure that the new estimate $\Delta\Phi_{20ms}$ from Equation 13 is reliable and better than $\Delta\Phi_{10ms}$, the value of N is compared to a threshold $N_{20ms}$, where a typical value of $N_{20ms}$ is 3. The one representation of this invention to decide the final estimate $\Delta\Phi$ is as follows:

$$\text{if } N\geq N_{20ms}, \Delta\Phi=\Delta\Phi_{20ms}, \qquad \text{Equation (16-A)}$$

$$\text{else } \Delta\Phi=2\times\Delta\Phi_{10ms}, \qquad \text{Equation (16-B)}$$

where $\Delta\Phi$ is the final estimation of the phase angle rotation per 20 ms. If $N<N_{20ms}$, it is not safe to use only N valid 20-ms sample rotation data $\Delta\Phi_k$ to re-calculate the averaged phase angle rotation. On the contrary, $\Delta\Phi_{10ms}$ from Equation 12 is an average of 5+M rotation samples, five of which do not have any phase ambiguity problem. Therefore, in this case, the present invention sticks to the original rotation estimate $\Delta\Phi_{10ms}$ from step 154, and Equation 16-B is used; otherwise, if N is large enough, Equation 16-A is used.

Equations (16-A) and (16-B) result in an averaged rotation angle $\Delta\Phi$ in the range of $-2\pi$ to $2\pi$. Therefore, the $\pi$ phase ambiguity is resolved and the phase rotation direction ambiguity associated with 20-ms sample data is resolved, yet the FLL tolerates a maximum of $\pm50$ Hz frequency error. It is believed that $\Delta\Phi$ is almost always better than $2\times\Delta\Phi_{10ms}$ in all different signal strength levels.

The selection between $\Delta\Phi_{20ms}$ and $2\times\Delta\Phi_{10ms}$ based on FIG. 11 (i.e., Equations (16-A) and (16-B)) is merely one embodiment of the present invention. Alternatively, for example, $\Delta\Phi_{20ms}$ is calculated with a weight as follows:

$$\Delta\Phi=\alpha\cdot\Delta\Phi_{20ms}+(1-\alpha)\cdot2\Delta\Phi_{10ms} \qquad \text{Equation (17)}$$

where weight $\alpha$ can be a function of N and the signal power level.

Referring back to FIG. 8, in step 158, with the averaged phase angle rotation estimate $\Delta\Phi$ per 20 ms finally calculated in 156, this step simply transforms the total phase angle rotation 5×ΔΦ in 100 ms into the frequency error, in accordance, for example, with the following equation:

$$\frac{5 \times \Delta\Phi}{2\pi \times 0.1} [\text{Hz}] \quad \text{Equation (18)}$$

This frequency error estimate is an input to the carrier loop filter for further smoothing.

Figure 13:
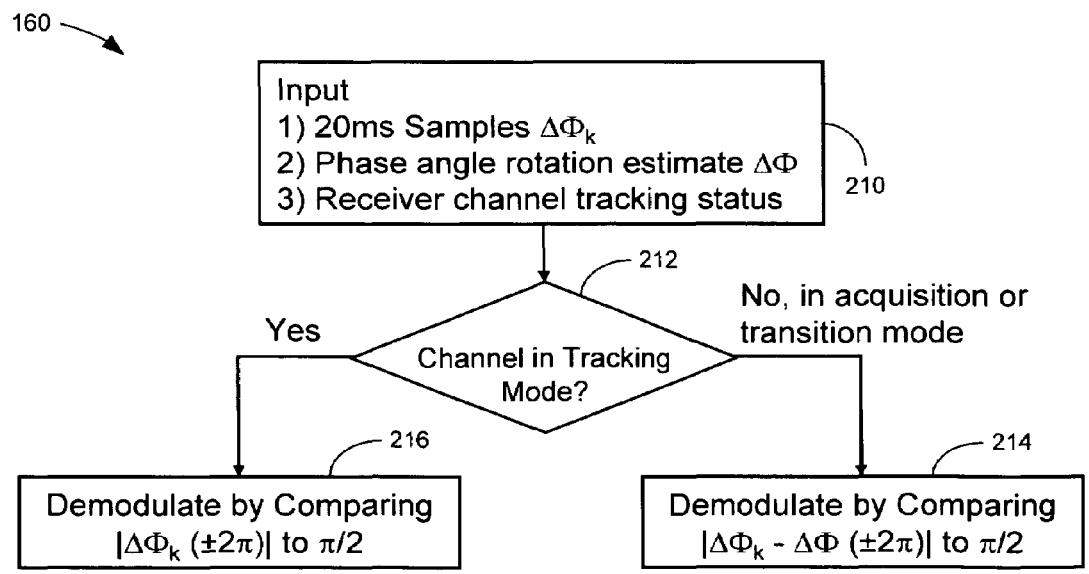
FIG. 13 is a flow chart illustrating the data demodulation steps, in accordance with one method of the present invention, in step 160 of FIG. 8.

In step 160, bit transitions are determined and demodulation is performed for all bits based on 20-ms samples $\Delta\Phi_k$, the phase rotation estimate $\Delta\Phi$ and the receiver channel tracking status. This step is illustrated in FIG. 13.

Typically, each receiver channel has some variables to indicate the signal tracking status, for example, a lock counter and an unlock counter. If a channel is in steady-state tracking mode, the phase rotation should be very small and close to zero. Therefore, in this case, the method of determining bit transitions is as follows:

No bit transition from bit k-1 to bit k if $|\Delta\Phi_k(\pm 2\pi)|$
$\leq \pi/2$      Equation (19-A)

A bit transition from bit k-1 to bit k if
$|\Delta\Phi_k(\pm 2\pi)| > \pi/2$      Equation (19-B)

where the value of $[\Delta\Phi_k(\pm 2\pi)]$ is in the range of $-\pi$ to $\pi$. In this decision logic, the instantaneous estimate $\Delta\Phi$ is not used, since zero can be a better estimate; however, $\Delta\Phi$ still needs to be fed into the loop filter, since the loop filter will further smooth $\Delta\Phi$. Thus, the frequency error estimation and data demodulation are completely independent of each other.

If a receiver channel is not in steady-state tracking mode indicated, for example, by unlock and lock counter, the channel is still acquiring (or re-acquiring) or is transitioning from acquisition/reacquisition to tracking mode, then the actual phase rotation can be quite large. In this case, the estimated phase rotation needs to be subtracted from $\Delta\Phi_k$ in data demodulation, i.e., No bit transition from bit k-1 to bit k if $|\Delta\Phi_k - \Delta\Phi$
$(\pm 2\pi)| \leq \pi/2$      Equation (20-A)

A bit transition from bit k-1 to bit k if $|\Delta\Phi_k - \Delta\Phi (\pm 2\pi)|$
$> \pi/2$      Equation (20-B)

where the value of $[\Delta\Phi_k - \Delta\Phi(\pm 2\pi)]$ is in the range of $-\pi$ to $\pi$.

After bit transitions are determined, the data demodulation is as direct as usual. Given the initial starting bit value at bit k=0, each of the following bits can be easily demodulated based on the bit transition chain. If there is no bit transition from bit k-1 to k, then bit k is the same as bit k-1; otherwise, bit k is the inversion of bit k-1. Finally, the last bit, bit 5, needs to be saved as bit 0 for the next FLL update.

Unlike in steps 154 and 156 where a bit transition can be a 'valid' or 'invalid', the step 160 uses π/2 as the threshold and determines whether a bit transition occurs between each of two neighboring bits.

Note the time needed for a channel to transition from acquisition/reacquisition to the steady-state tracking mode, if a signal actually comes back, is very short. Depending on the loop filter bandwidth, typically the transition can be finished in one or three seconds.

The demodulation method of the present invention does not feed the information of bit transitions resolved in step 160 back to the estimation of the frequency error. It does not recursively estimate the frequency error and demodulate bits.

FIG. 9 shows further steps performed in carrying out step 154 of FIG. 8. At step 162, in FIG. 9, the variables k, m and $\Psi_{10ms}$ are initialized as shown. Next, at step 164, $\Delta\Phi_{kba,res}$ is calculated pursuant to Equation (10). Next, at 166, if it is determined that $|\Delta\Phi_{kba,res}|$ is less than $\theta_{10ms}$, the process proceeds to step 168 where a determination is made as to whether $|\Delta\Phi_{kba,res}|$ is greater than $\pi - \theta_{10ms}$ and if so, the process continues to step 172, otherwise, the process continues to step 176. At step 176, $\Delta\Phi_{kba}$ is declared 'invalid' and next, at step 178, 'k' is incremented by one and at 180 and the incremented k is checked against the value '5'. In this example, since 5 samples are used, k is checked against 5, however, in other embodiments, k may be checked against a different value depending on the number of samples being used. If k is declared to be smaller than or equal to 5, the process continues at step 164, otherwise, the process continues to step 182 where $\Delta\Phi_{10ms}$ is calculated in accordance with Equation (12) above.

In FIG. 9, at 166, if it is determined that $|\Delta\Phi_{kba,res}|$ is less than $\theta_{10ms}$, then the process proceeds to step 170 where $\Delta\Phi_{kba,effective}$ is set equal to $\Delta\Phi_{k,ba}$ and next, at step 174, $\Delta\Phi_{kba}$ is declared 'valid' and M is incremented by one and $\Psi_{10ms}$ is set equal to $\Delta\Phi_{kba,effective}$ of step 170 plus one or incremented by one. "$\Psi$", as used herein, is a temporary variable to sum up $\Delta\Phi_{kba,effective}$. Both 'k' and '$\Psi$', as used herein, are temporary variables to realize a summation function.

At step 172, $\Delta\Phi_{kba,effective}$ is calculated in accordance with Equation (11).

Figure 10:
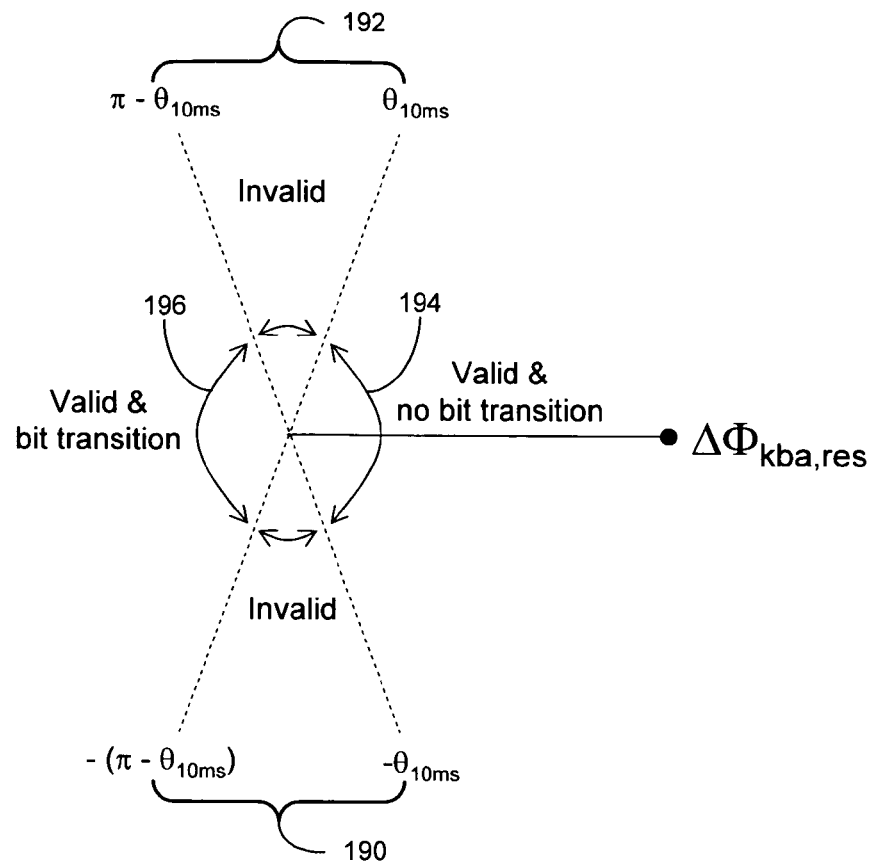
FIG. 10 is a phasor diagram illustrating the $\pi$ phase shift ambiguity resolution and validation method used in step 154 of FIG. 8

FIG. 10 shows a phase diagram of the phase of $\Delta\Phi_{kba,res}$ where certain areas are phases that a declaration of an 'invalid' sample because they are a threshold distance from an expected phase, namely, these areas are identified at 190 and 192 in FIG. 10. The phase at 194 causes declaration of a 'valid' sample and no bit transition while the phase at 196 causes declaration of a 'valid' sample and a bit transition.

As discussed before, FIG. 11 shows further details of the way in which the final estimated phase angle rotation $\Delta\Phi$ per 20 ms is calculated every 100 ms. In FIG. 11, at step 200, the number of valid $\Delta\Phi_k$ samples is determined, which is N, and the average phase rotation $\Delta\Phi_{20ms}$ is calculated using valid $\Delta\Phi_k$ samples. Next, at 202, N is checked against threshold $N_{20ms}$ and if N is large enough, the process continues to step 208, otherwise, the process continues to step 204. At step 208, $\Delta\Phi$ is set equal to $\Delta\Phi_{20ms}$. At step 204, $\Delta\Phi$ is set equal to $2 \times \Delta\Phi_{10ms}$, which is shown relative to Equations (16-A) and (16-B). $\Delta\Phi$ is regarded as the final estimate phase angle rotation per 20 ms and is returned at step 206.

FIG. 12 shows steps performed as a part of step 200 of FIG. 11. The steps of FIG. 12 are similar to that of FIG. 9 except they are performed for the case of 20 ms rather than 10 ms samples. Thus, for example, the threshold is for that of 20 ms samples and denoted as $\theta_{20ms}$, similarly, $\Delta\Phi_{kba}$ is $\Delta\Phi_k$ for the case of 20 ms and so on. Therefore, the particular steps of FIG. 12 will not be further discussed.

In FIG. 13, a flow chart is presented showing further details of the step 160 of FIG. 8. In FIG. 13, at step 210, a number of input is used, such as the 20 ms samples $\Delta\Phi_k$, phase angle rotation estimate $\Delta\Phi$ and the receiver channel tracking status. Next, at 212, it is determined whether or not the channel is in tracking mode and if not, step 214 is performed, otherwise, step 216 is performed. Bit transitions are determined and demodulation is performed for all bits based on 20-ms samples $\Delta\Phi_k$, the phase rotation estimate $\Delta\Phi$ and the receiver channel tracking status.

Typically, each receiver channel has some variables to indicate the signal tracking status, for example, a lock counter and an unlock counter. If a channel is in steady-state tracking mode, the phase rotation should be very small and close to zero. Therefore, in this case, the method of determining bit transitions, at step 216, is done pursuant to Equations (19-A) and (19-B).

In this decision logic, the instantaneous estimate ΔΦ is not used, since zero can be a better estimate; however, ΔΦ still needs to be fed into the loop filter, since the loop filter will further smooth ΔΦ. Thus, the frequency error estimation and data demodulation are completely independent of each other.

If a receiver channel is not in steady-state tracking mode indicated, for example, by unlock and lock counter, the channel is still acquiring (or re-acquiring) or is transitioning from acquisition/reacquisition to tracking mode, then the actual phase rotation can be quite large. In this case, the estimated phase rotation needs to be subtracted from $\Delta\Phi_k$ in data demodulation pursuant to Equations (20-A) and (20-B).

After bit transitions are determined, the data demodulation is as direct as usual. Given the initial starting bit value at bit k=0, each of the following bits can be easily demodulated based on the bit transition chain. If there is no bit transition from bit k-1 to k, then bit k is the same as bit k-1; otherwise, bit k is the inversion of bit k-1. Finally, the last bit, bit 5, needs to be saved as bit 0 for the next FLL update.

The step 160 uses π/2 as the threshold and determines whether a bit transition occurs between each of two neighboring bits.

Note the time needed for a channel to transition from acquisition/reacquisition to the steady-state tracking mode, if a signal actually comes back, is very short. Depending on the loop filter bandwidth, typically the transition can be finished in one or three seconds.

The demodulation method of the various embodiments of the present invention does not feed the information of bit transitions resolved in step 160 back to the estimation of the frequency error. It does not recursively estimate the frequency error and demodulate bits.

Figure 14:
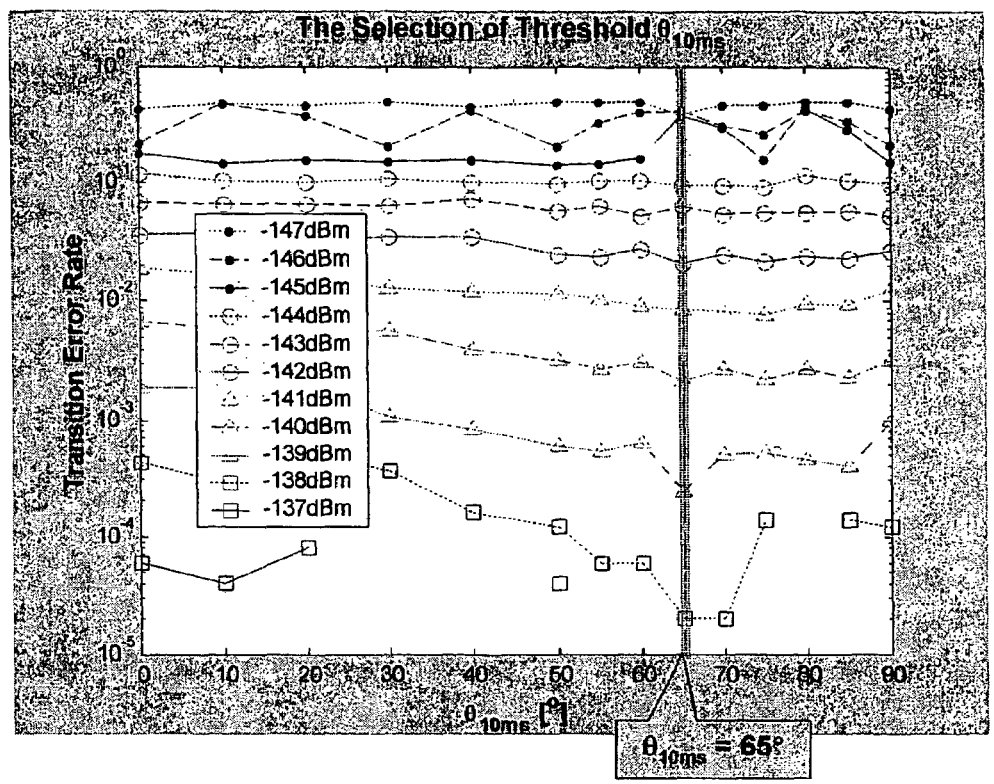
FIG. 14 is a graph illustrating a method, in accordance with one method of the present invention, of determining the value of threshold $\theta_{10ms}$.

FIG. 14 illustrates a method of determining the value of the threshold $\theta_{10ms}$. In order to evaluate the accuracy of the phase rotation estimate $\Delta\Phi_{10ms}$ with a different value of $\theta_{10ms}$, Equation (16-B), not Equation (16-A), is always selected no matter what the value of N is in step 156, and Equations (20-A) and (20-B), not Equations (19-A) and (19-B), is also always used in step 160 no matter whether a channel is in a steady-state tracking mode. A simulation program is setup in such a way where a series of random bit transitions, with additive Gaussian noise, is generated. Since this series of random bit transition is known to the simulation program, they can be compared to the data demodulation results. The value of threshold $\theta_{10ms}$ is optimized if the data demodulation gives the lowest transition error rate.

FIG. 14 shows the transition error rates with different values of $\theta_{10ms}$ for signals at different power levels. When the value of $\theta_{10ms}$ is increased from 0, more samples will be validated and the transitions error rates decrease. If the value of $\theta_{10ms}$ is increased to be close to 90°, then all samples will be validated, and some mistakenly validated samples will jeopardize the estimate. It has been experienced that the transition error rates for almost all signal power levels are minimized when $\theta_{10ms}$ is about 65°.

In one embodiment of the present invention, a constant threshold $\theta_{10ms}$ is employed for all signals at different power levels. Using a different value of $\theta_{10ms}$ for a different signal power level is an alternative method, which could possibly further improve the performance, thought it is more complicated.

Figure 15:
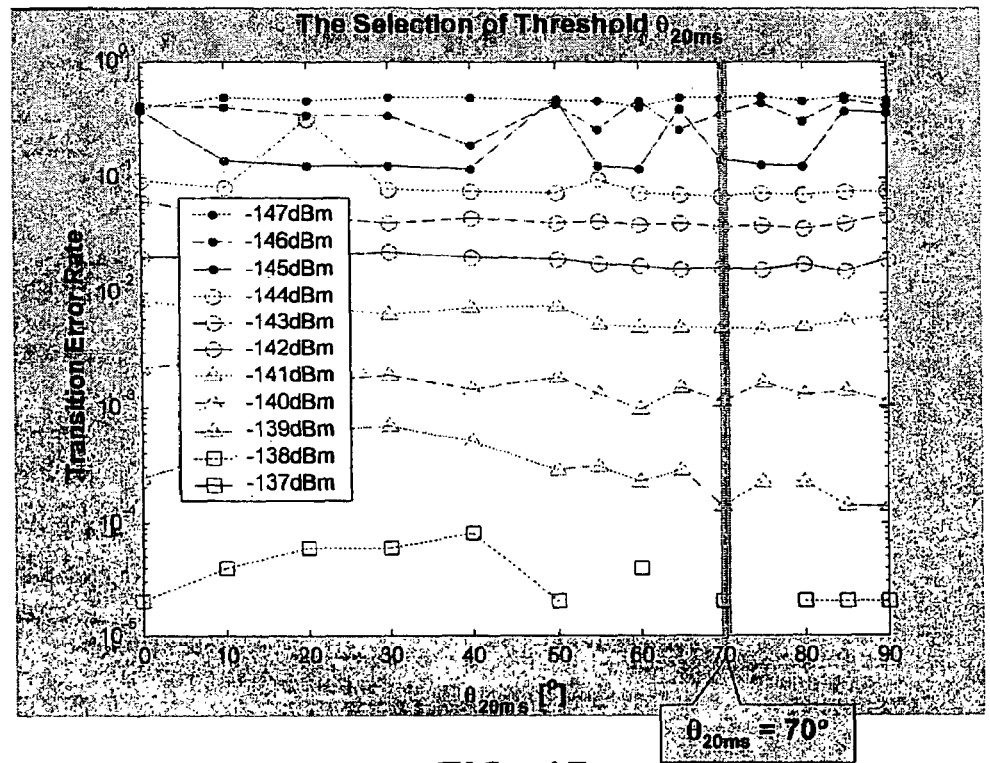
FIG. 15 is a graph illustrating a method of determining the value of threshold $\theta_{20ms}$, in accordance with one method of the present invention.

FIG. 15 illustrates a graph of the method for determining the value of threshold $\theta_{20ms}$, which is similar to FIG. 14. Setting $\theta_{10ms}$=65° and $N_{20ms}$=3, the simulation program is used again to search for an optimal $\theta_{20ms}$ so that the transition error rates are minimized. Equations (20-A) and (20-B), not Equations (19-A) and (19-B), are always selected in step 160 in order to check the quality of ΔΦ. The figure shows that the transition error rates for all different signal power levels are nearly the lowest when $\theta_{20ms}$ is about 70°. Using a different value of $\theta_{20ms}$ for a different signal power level is an alternative method.

Figure 16:
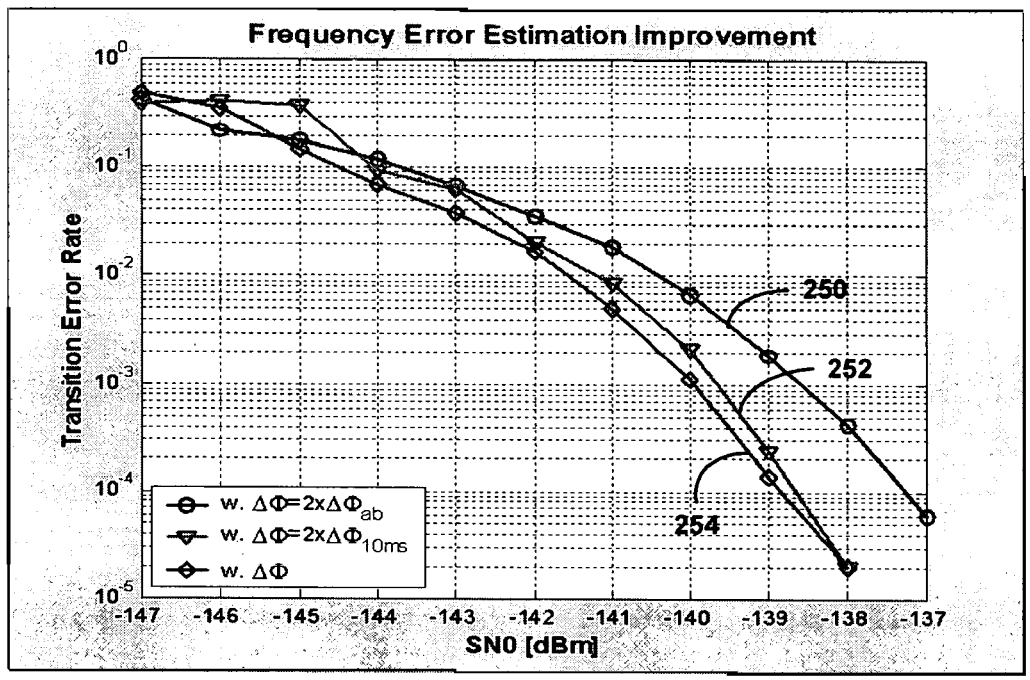
FIG. 16 is a graph illustrating the improvement of the frequency error estimate step by step in accordance with one method of the present invention.

FIG. 16 is a graph demonstrating the improvement of the frequency error estimate. The y-axis is the transition error rate by always selecting Equations (20-A) and (20-B), not Equations (19-A) and (19-B), in step 160, i.e., non steady-state tracking mode is assumed. There are three curves shown in FIG. 16: the curve 250 corresponds to the transition error rate if ΔΦ is always set at $2\times\Delta\Phi_{ab}$ in Equations (20-A) and (20-B), the curve 252 corresponds to transition error rate if ΔΦ=2×$\Delta\Phi_{10ms}$, and the curve 254 represents ΔΦ from fully functional step 156. This figure shows that the frequency error estimate ΔΦ is more accurate than $2\times\Delta\Phi_{10ms}$ and that $2\times\Delta\Phi_{10ms}$ is more accurate than $2\times\Delta\Phi_{ab}$, where the accuracy is evaluated in terms of the transition error rate in data demodulation. Note for very weak signals, it seems that the red-circle line is below the blue-diamond the line. Actually, with a data bit error rate of almost 50%, no meaningful words can be constructed.

Figure 17:
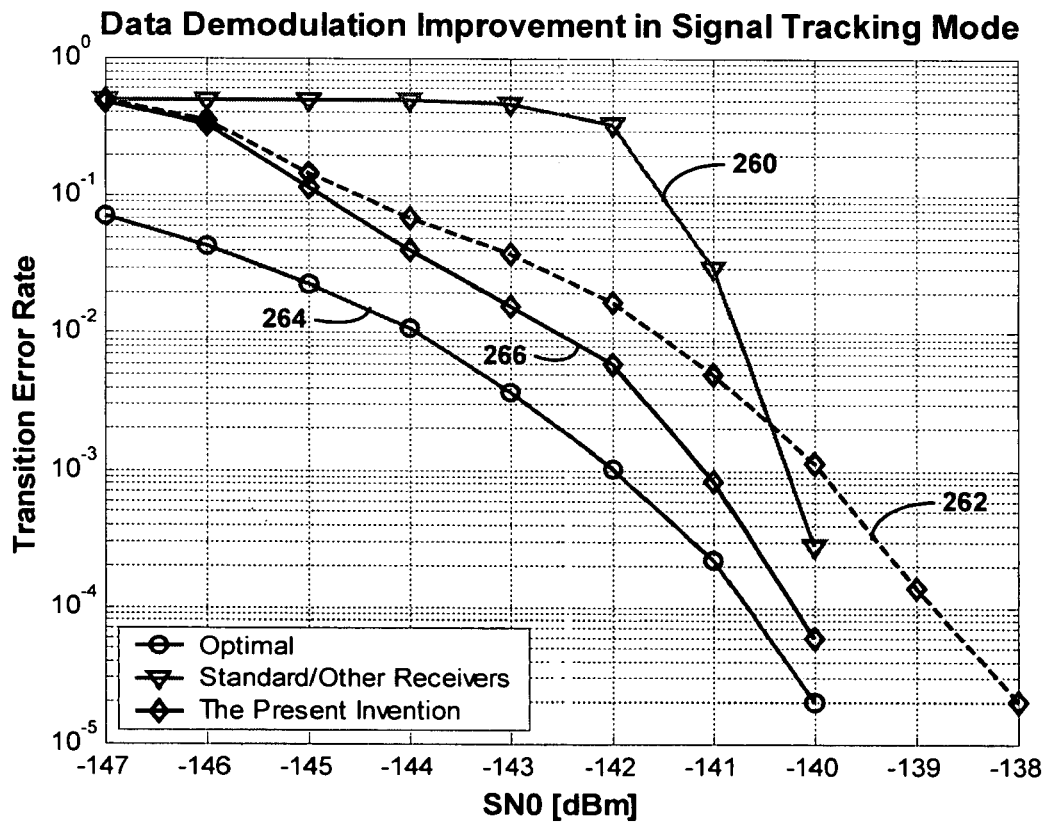
FIG. 17 is a graph comparing the performance of the invention to other methods.

FIG. 17 is a graph comparing the performance of the embodiments and method of the present invention to those of other methods. In FIG. 17, the curve 260 shows the transition error rate by a known type of receiver, the curve 266 shows the transition error rate if a channel is in the steady-state tracking mode, in accordance with an embodiment of the present invention, and the curve 264 is the theoretical or ideal transition error rate. The curve 262 is the same as the curve 254 of FIG. 16, where the channel is assumed to not be in the steady-state tracking mode. The curve 266, as compared to the curve 260, is clearly far below the latter, thus, exhibiting lower transition error rate. Even if the receiver experiences high dynamic user motion all the time and a channel is not in a steady-state tracking mode, its performance represented by the curve 262 is still great.

Note that in all figures from FIG. 14 to FIG. 17, the signal level SN0 along the x-axis includes a bias due to the power bias in noise generated by the simulation program. Actual data demodulation performance has been experienced to be about 2 dB better than those plotted in FIG. 17.

In the embodiment of the present invention, as discussed and illustrated herein, frequency error estimates are obtained by utilizing I and Q samples with both short and long coherent integration times. This allows the FLL to tolerate a wide pull-in frequency error range by utilizing short-time coherent integration samples and to maintain a high tracking sensitivity offered by long-time coherent integrated samples. Furthermore, an initial frequency error estimate is obtained using sample data within a bit interval. This estimate is insensitive to bit transitions. Additionally, π phase shift ambiguities caused by bit transitions are resolved for both short-and long-time integrated sample data across bits. If an angle rotation sample is close to the latest averaged phase rotation estimate within a threshold, no bit transition is detected and this sample is declared 'valid'. A sample can either be 'valid' with or without a bit transition, or be 'invalid'.

Embodiments of the present invention, allow for utilizing only 'valid' samples to improve the frequency error estimate quality. If a sample is detected as 'invalid', its bit transition status need not be decided and this sample can be ignored at this stage. In another embodiment of the present invention, such as the case where 20 ms samples are employed, long coherently integrated sample data are generated by summing up short coherently integrated sample data in order to reduce noise in samples.

Additionally, phase rotation direction ambiguity associated with long integrated sample data is resolved. The frequency error is re-estimated based preferably on 'valid', long integrated samples. The decision logic on selecting the frequency error estimate with 'valid' 10 ms or 20 ms samples can be based on the number of 'valid' 20 ms data or their weighted combination. In yet another embodiment of the present invention, the demodulating bits are based always on long integrated samples. Additionally, data are demodulated differently based on whether the receiver channel is in a steady state tracking mode or not. If a channel is in a steady state tracking mode, the phase angle rotation should be very small, thus, zero degree phase angle rotation can be assumed in the data demodulation; otherwise, the estimated frequency error needs to be considered in the data demodulation.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of improving estimation of frequency error in a frequency locked loop (FLL) comprising:

receiving k samples of in-phase ($I_{ka}$) and quadrature-phase $Q_{ka}$ and in-phase ($I_{kb}$) and quadrature-phase ($Q_{kb}$) by an integrate and dump block;

generating k samples of integrated in-phase ($I_k$) and quadrature-phase ($Q_k$) samples from the $I_{ka}$, $Q_{ka}$, $I_{kb}$ and $Q_{kb}$ samples extending, in time interval, longer than the rate at which they were integrated;

calculating phase angles, $\Phi_{ka}$, $\Phi_{kb}$, $\Phi_k$, of the received samples based on the received and generated k samples, wherein 'k' represents a sample number and 'a' and 'b' are each integers;

calculating phase rotations, $\Delta\Phi_{kab}$, $\Delta\Phi_{kba}$, $\Delta\Phi_k$ using the calculated phase angles, $\Phi_{ka}$ and $\Phi_{kb}$, by a carrier loop discriminator block;

computing averaged phase rotation $\Delta\Phi_{ab}$ using $\Delta\Phi_{kab}$ phase rotations between each pair of neighboring received samples within the same data bit intervals;

determining 'valid' sample averaged rotation $\Delta\Phi_{kab}$ based on the ability to detect a bit transition or no bit transition;

computing improved averaged phase rotation using the sample averaged rotation 'valid' $\Delta\Phi_{kab}$;

computing averaged phase rotation using the sample averaged rotation 'valid' $\Delta\Phi_k$; and determining a final phase error estimate $\Delta\Phi$ to be used for estimation of a frequency error.

2. A method of improving estimation of frequency error, as recited in claim 1, further including the steps of calculating the frequency error using the final phase error estimate and providing the frequency error to the FLL for adjustment of a carrier frequency.

3. A method of improving estimation of frequency error, as recited in claim 1, further including the step of disregarding phase rotation samples associated with a phase rotation estimate that is beyond a predetermined threshold value in the determining 'valid' sample averaged rotation step.

4. A method of improving estimation of frequency error, as recited in claim 1, wherein the FLL is updated and updating the FLL at time durations that are longer than a bit duration so that the frequency error estimate is based on multiple samples averaged before being processed by an FLL loop filter.

5. A method of improving estimation of frequency error, as recited in claim 1, further including the step of utilizing samples with both short and long coherent integration times defined as short coherent integration samples and long coherent integration samples.

6. A method of improving estimation of frequency error, as recited in claim 1, further including obtaining an initial frequency error estimate using samples within a bit interval.

7. A method of improving estimation of frequency error, as recited in claim 1, further including avoiding the use of samples detected as being not 'valid'.

8. A method of improving estimation of frequency error, as recited in claim 7, wherein for samples detected as being not 'valid', avoiding deciding the samples' bit transition status.

9. A method of improving estimation of frequency error, as recited in claim 5, further including the step of constructing long coherently integrated samples by coherently summing the short coherently integrated samples in order to reduce noise in samples.

10. A frequency locked loop (FLL) responsive to samples generated by an integration and dump block comprising:

a carrier loop discriminator for generating data bits and providing frequency error estimation information to a carrier loop filter based on a phase error estimation, the phase error estimation being determined by receiving k samples of in-phase ($I_{ka}$), quadrature-phase ($Q_{ka}$), in-phase ($I_{kb}$) and quadrature-phase ($Q_{kb}$);

generating k samples of integrated in-phase ($I_k$) and quadrature-phase ($Q_k$);

calculating phase angles, $\Phi_{ka}$, $\Phi_{kb}$, $\Phi_k$, of the received samples;

calculating phase rotations, $\Delta\Phi_{kab}$, $\Delta\Phi_{kba}$, $\Delta\Phi_k$, using the calculated phase angles, $\Phi_{ka}$, $\Phi_{kb}$, wherein 'k', 'a' and 'b' are each integers;

computing averaged phase rotation $\Delta\Phi_{ab}$ using $\Delta\Phi_{kab}$ phase rotations between each pair of neighboring received samples within the same data bits;

determining 'valid' sample averaged rotation $\Delta\Phi_{kab}$ based on the ability to detect a bit transition or no bit transition;

computing improved averaged phase rotation using the 'valid' sample averaged rotation $\Delta\Phi_{kab}$;

computing averaged phase rotation using the 'valid' sample averaged rotation $\Delta\Phi_k$, and determining a final phase error estimate $\Delta\Phi$ to be used for estimation of frequency error.

11. A frequency locked loop (FLL), as recited in claim 10, wherein the carrier loop discriminator for calculating the frequency error using the final phase error estimate and providing the frequency error to the FLL for adjustment of the carrier frequency.

12. A frequency locked loop (FLL), as recited in claim 10, wherein the FLL is updated at a rate of time durations that are longer than a bit time duration so that the frequency error estimate is based on multiple samples averaged before being processed by the carrier loop filter.

13. A frequency locked loop (FLL), as recited in claim 10, wherein phase rotation samples associated with a phase rotation estimate that is beyond a predetermined threshold value are disregarded.

14. A frequency locked loop (FLL), as recited in claim 12, wherein the averaged phase rotation $\Delta\Phi_{ab}$ is subtracted from $\Delta\Phi_{kba}$ prior to the use of the threshold value.

15. A global positioning system (GPS) receiver comprising:
   A carrier loop including;
   A frequency lock loop (FLL) for adjusting a frequency of a receiver-generated carrier signal to a frequency of a received carrier signal, the FLL including:
   a carrier loop discriminator for generating data bits and providing frequency error estimation information to a carrier loop filter based on a phase error estimation, the phase error estimation being determined by receiving k samples of in-phase ($I_{ka}$), quadrature-phase ($Q_{ka}$), in-phase ($I_{kb}$) and quadrature-phase ($Q_{kb}$);
   generating k samples of integrated in-phase ($I_k$) and quadrature-phase ($Q_k$), wherein 'k', 'a' and 'b' are each integers;
   calculating phase angles, $\Phi_{ka}$, $\Phi_{kb}$, $\Phi_k$, of the received samples;
   calculating phase rotations, $\Delta\Phi_{kab}$, $\Delta\Phi_{kba}$, $\Delta\Phi_k$, using the calculated phase angles, $\Phi_{ka}$, $\Phi_{kb}$,
   computing averaged phase rotation $\Delta\Phi_{ab}$ using $\Delta\Phi_{kab}$ phase rotations between each pair of neighboring received samples within the same data bits;
   determining 'valid' sample averaged rotation $\Delta\Phi_{kab}$ based on the ability to detect a bit transition or no bit transition;
   computing improved averaged phase rotation using the 'valid' sample averaged rotation $\Delta\Phi_{kab}$;
   computing averaged phase rotation using the 'valid' sample averaged rotation $\Delta\Phi_k$, and
   determining a final phase error estimate $\Delta\Phi$ to be used for estimation of frequency error.

16. A GPS receiver, as recited in claim 14, wherein the carrier loop discriminator calculates the frequency error using the final phase error estimate and providing the frequency error to the FLL for adjustment of the carrier frequency.

17. A GPS receiver, as recited in claim 14, wherein the carrier frequency loop discriminator disregards phase rotation samples associated with a phase rotation estimate that is beyond a predetermined value.

18. A GPS receiver, as recited in claim 14, wherein the FLL is updated at a rate of time durations that are longer than a bit time duration so that the frequency error estimate is based on multiple samples averaged before being processed by the loop filter.

19. A method of improving estimation of frequency error in a frequency locked loop (FLL) comprising:
   receiving k samples of in-phase ($I_{ka}$) and quadrature-phase $Q_{ka}$ and in-phase ($I_{kb}$) and quadrature-phase ($Q_{kb}$) by an integrate and dump block;
   calculating phase angles, Φka, Φkb, Φk, of the received samples, wherein 'k', 'a' and 'b' are each integers;
   calculating phase rotations, $\Delta\Phi_{kab}$, $\Delta\Phi_{kba}$, $\Delta\Phi_k$ using the calculated phase angles, Φka, Φkb, by a carrier loop discriminator block;
   computing averaged phase rotation $\Delta\Phi_{ab}$ using $\Delta\Phi_{kab}$ phase rotations between each pair of neighboring received samples within the same data bit intervals;
   determining 'valid' sample averaged rotation $\Delta\Phi_{kab}$ based on the ability to detect a bit transition or no bit transition; and
   determining a final phase error estimate $\Delta\Phi$ to be used for estimation of a frequency error.

20. A method of improving estimation of frequency error, as recited in claim 18, further including the step of computing averaged phase rotation using the 'valid' sample averaged rotation $\Delta\Phi_{kab}$.

21. A global positioning satellite (GPS) receiver employing
   frequency locked loop (FLL) comprising:
   a carrier loop discriminator for generating data bits and providing frequency error estimation information to a carrier loop filter based on a phase error estimation, the phase error estimation being determined by receiving k samples of in-phase ($I_{ka}$), quadrature-phase ($Q_{ka}$), in-phase ($I_{kb}$) and quadrature-phase ($Q_{kb}$), generating $I_k$ and $Q_k$, calculating phase angles, $\Phi_{ka}$, $\Phi_{kb}$, $\Phi_k$, of the received samples, calculating phase rotations, $\Delta\Phi_{kab}$, $\Delta\Phi_{kba}$, $\Delta\Phi_k$ using the calculated phase angles, $\Phi_{ka}$, $\Phi_{kb}$, computing averaged phase rotation $\Delta\Phi_{ab}$ using $\Delta\Phi_{kab}$ phase rotations between each pair of neighboring received samples within the same data bits, determining 'valid' sample averaged rotation $\Delta\Phi_{kab}$ based on the ability to detect a bit transition or no bit transition, computing improved averaged phase rotation using the 'valid' sample averaged rotation $\Delta\Phi_{kab}$, computing averaged phase rotation using the 'valid' sample averaged rotation $\Delta\Phi_{kab}$, and determining a final phase error estimate $\Delta\Phi$ to be used for estimation of frequency error,
   wherein frequency error estimation is substantially improved.

22. A global positioning satellite (GPS) receiver, as recited in claim 19, wherein the carrier loop discriminator is operative to compute the averaged phase rotation using 'valid' $\Delta\Phi_k$.

23. A global positioning satellite (GPS) receiver, as recited in claim 19, wherein the carrier loop discriminator is employed in an electronic hand-held device.

24. A global positioning satellite (GPS) receiver, as recited in claim 19, wherein the carrier loop discriminator is employed in a mobile phone.

25. A global positioning satellite (GPS) receiver, as recited in claim 21, wherein the carrier loop discriminator is employed in an automobile.

26. A method of improving estimation of frequency error, as recited in claim 1, wherein the $I_k$ and $Q_k$ samples are coherently integrated from the $I_{ka}$, $Q_{ka}$, $I_{kb}$ and $Q_{kb}$ samples.

* * * * *